(12) United States Patent
Sibley

(10) Patent No.: US 6,995,529 B2
(45) Date of Patent: Feb. 7, 2006

(54) FLYWHEEL ENERGY STORAGE SYSTEMS

(76) Inventor: Lewis B. Sibley, 695 Farmland Way, Coatesville, PA (US) 19320

( * ) Notice: Subject to any disclaimer, the term of this patent is extended or adjusted under 35 U.S.C. 154(b) by 0 days.

(21) Appl. No.: 10/489,212

(22) PCT Filed: Sep. 12, 2002

(86) PCT No.: PCT/US02/29009

§ 371 (c)(1),
(2), (4) Date: Oct. 20, 2004

(87) PCT Pub. No.: WO03/023942

PCT Pub. Date: Mar. 20, 2003

(65) Prior Publication Data

US 2005/0040776 A1    Feb. 24, 2005

Related U.S. Application Data

(60) Provisional application No. 60/318,537, filed on Sep. 13, 2001.

(51) Int. Cl.
*H02K 7/02*   (2006.01)

(52) U.S. Cl. .................................... 318/161; 74/572
(58) Field of Classification Search .............. 318/150, 318/161; 74/572, 573 R
See application file for complete search history.

(56) References Cited

U.S. PATENT DOCUMENTS

| | | | |
|---|---|---|---|
| 3,773,155 A * | 11/1973 | Fujita et al. ............. | 192/70.25 |
| 5,398,571 A | 3/1995 | Lewis ........................ | 74/572 |
| 5,880,544 A * | 3/1999 | Ikeda et al. ................. | 310/74 |
| 5,924,335 A * | 7/1999 | Kuklo ........................ | 74/572 |
| 6,848,553 B2 * | 2/2005 | DePiazza ................... | 192/52.5 |

* cited by examiner

*Primary Examiner*—Bentsu Ro
(74) *Attorney, Agent, or Firm*—Charles N. Quinn, Esq.

(57) ABSTRACT

A flywheel energy storage system (10) includes a vacuum enclosure (18) having a flywheel (12), motor/generator (14), and a shaft (16) enclosed within. The flywheel and motor/generator combination are designed to minimize bearing loads and thus increase system life, reliability and safety.

24 Claims, 21 Drawing Sheets

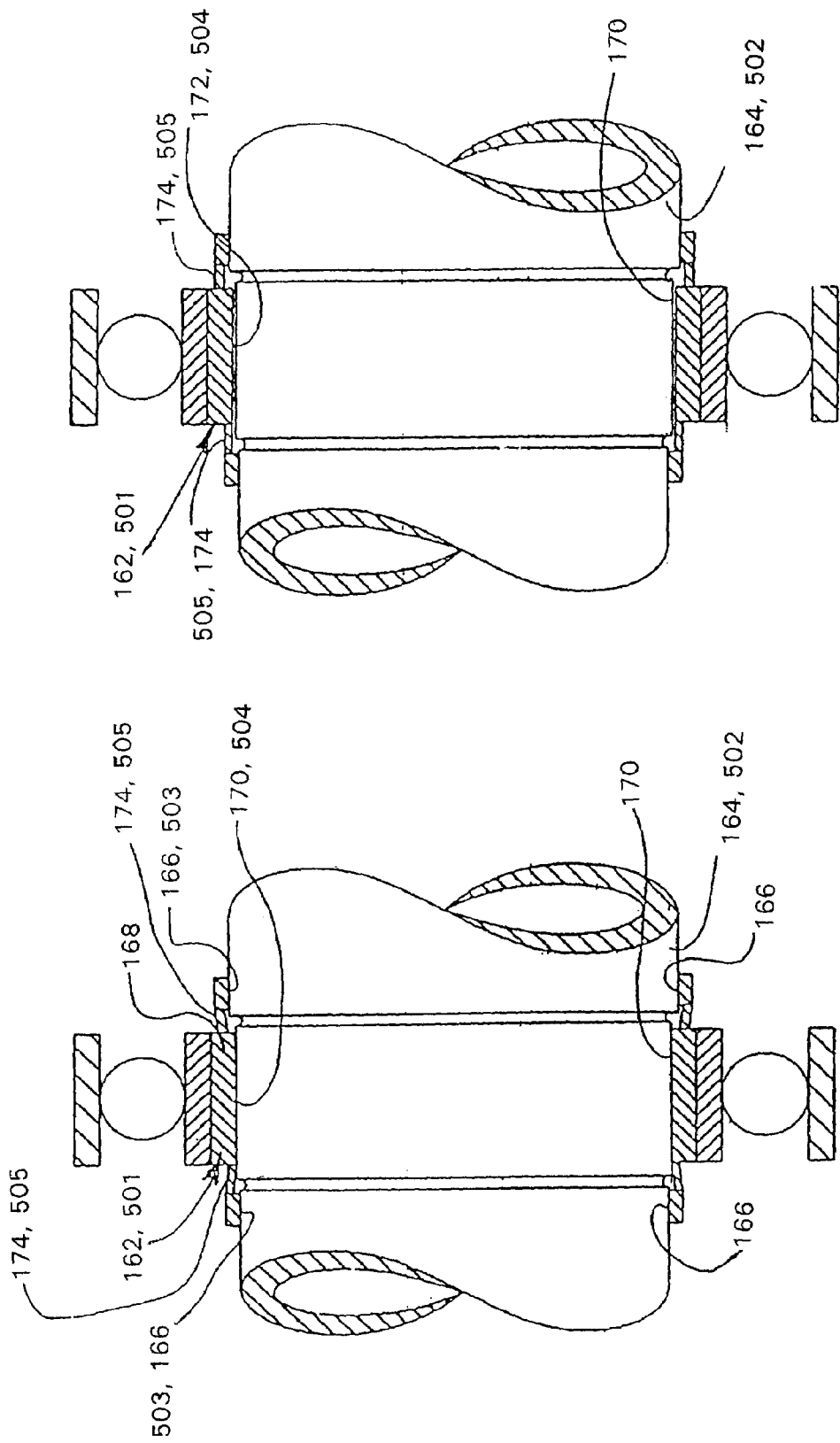

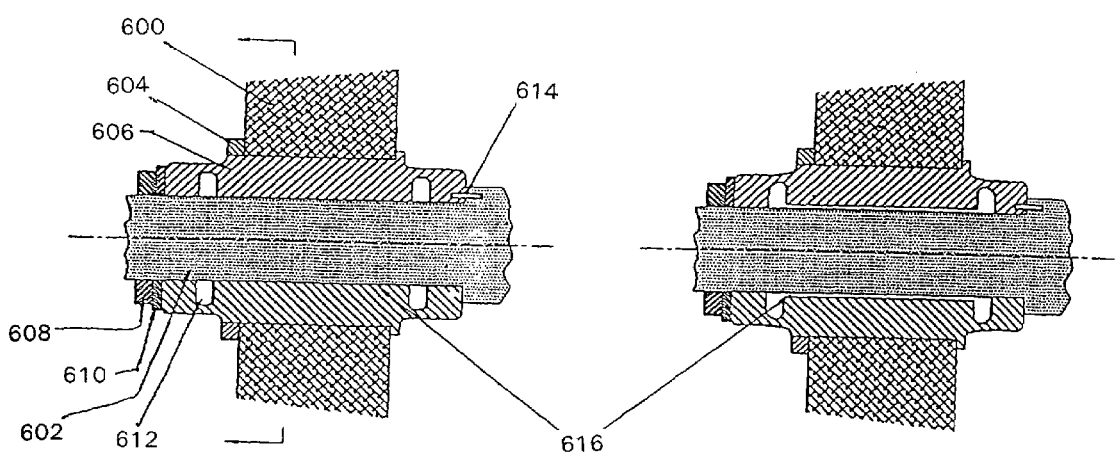
FIG. 26  FIG. 27
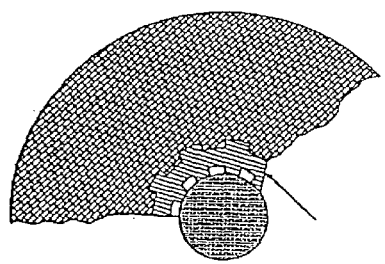 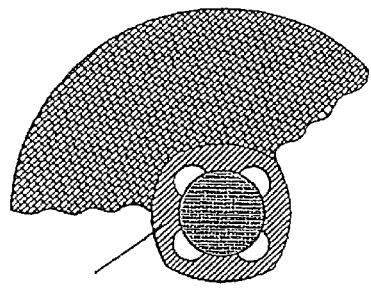
FIG. 28  FIG. 29

FLYWHEEL ENERGY STORAGE SYSTEMS

This application claims the benefit of Provisional Application No. 60/318,537, filed Sep. 13, 2001.

INCORPORATION BY REFERENCE

The disclosures of U.S. Pat. Nos. 5,486,052, 5,356,227 and 5,066,145 are hereby incorporated by reference.

BACKGROUND OF THE INVENTION

1. Field of the Invention

This invention relates to flywheel energy storage systems, to integration of advanced-technology fiber-reinforced composite thick-ring flywheels, low-cost continuous-filament unbonded steel wire and other filament flywheels and mounting hub designs, with ultra-compact and in some cases low-cost conventional motor/generators and digital signal processing-based electronic controller systems, fail-safe vacuum enclosures, emergency energy-dump and containment systems and ball, roller and sleeve bearings having solid lubricants, all of which can operate reliably for many years without maintenance. This invention also relates to the use of the gyroscopic moment generated by such flywheel for orienting the load of a suspended device in the manner described in U.S. Pat. No. 5,632,222, in addition to, or instead of, energy storage.

2. Description of the Prior Art

Storing energy as kinetic energy in a rotating flywheel is known. However, despite recent improvements in fiber-reinforced composites, continuous-filament-wound ring designs, electronic controls, and bearing lubrication and vibration-control technology, flywheel energy systems have still been only potentially competitive with alternative energy storage devices such as chemical batteries and ultra-capacitors.

Conventional flywheel materials are limited in their energy storage capacity by their centrifugal burst strength at high rotating speeds.

Motor/generators and controls typically used with flywheels are too bulky and cannot run at the high speeds required for a compact flywheel energy storage system to fit the volume constraints of automotive and other vehicular applications.

Application of lower energy density flywheel energy storage systems for stationary utility load-leveling applications has not been successful due in part to lack of proven designs for low-cost continuous-filament ring materials.

The transverse-flux permanent magnet motor provides high power densities with high efficiency and is believed to have been first described by Dr. H. Weh in a paper published in 1988 entitled "New Permanent Magnet Excited Synchronous Machine With High Efficiency at Low Speeds" as a means to obtain high power densities with high efficiencies to reduce weight, cost, energy losses and maintenance.

Conventional commercial brushless DC motors use Hall effect, i.e. magnetically switched, non-contacting sensors to sense rotor position. A signal is provided to an inverter to commutate to the next phase in sequence when the root magnet axis reaches a predetermined position. In this way motor windings are energized so as to maximize the amount of torque output for the motor at any given speed. However, known Hall-effect systems are complex, awkward and difficult to manufacture, install and align, limiting their use in high-speed machines where brushless characteristics are a distinct advantage.

Conventional high-speed bearings require a supply of air-oil mist, circulating lubricating oil or periodic replenishment of grease to provide adequate lubrication between the moving surfaces, so friction does not cause the bearings to overheat and self-destruct during operation.

In high-speed flywheel energy storage systems, conventional bearings do not have sufficient life in the vacuum environment required to minimize windage losses and composite flywheel ring overheating. Thus, some flywheel systems rely on active magnetic bearings. Even magnetic bearings, however, require auxiliary ball or roller bearings to support the rotor in the event either of an inadvertent loss of power to the magnetic bearings or high gyroscopic maneuvering or impact loads that exceed the load capability of the magnetic bearings.

Lubricating greases and the ultra-low volatility synthetic lubricating oils required in the high vacuum of such systems with low cost ball bearings do not have the additive response of synthetic hydrocarbons or conventional petroleum-based oils, so that they have unacceptably short boundary lubricating ability and bearing life. In this regard see the paper by Mahncke and Schwartz entitled "Grease Lubrication of Rolling Bearings in Spacecraft" published in *ASLE Transactions*, Vol. 17, No. 3, Pgs. 172–181.

High rotating speeds result in so much centrifugal expansion of flywheel-rings that special provisions are required to mount such rings on bearing-supported rotors with the motor/generator rotor. The mounting system in U.S. Pat. No. 4,860,611 provides a mounting hub design suitable for use at substantially high speeds, but even higher speeds are desirable. Hence, further improvements in mounting designs are needed.

Adequately reliable solid-lubricated, high-speed bearing systems for use in especially high vacuum environments are not known. The bearing industry markets several types of dry bearing materials based on such molybdenum disulfide, graphite, Teflon and other plastics used as solid lubricants. Woven glass fiber-reinforced Teflon bearings are fabricated by bonding a stiff metal backing to a thin composite layer of soft lubricating Teflon, reinforced with a hard glass fabric. A very thin film of Teflon lubricates the glass fibers with a minimum of deflection, plastic flow and wear. In such known solid-lubricated bearing applications, sporadic catastrophic bearing failures occur.

Self-contained greased-for-life bearings have limited high-speed capabilities and require frequent re-lubrication.

In high-speed rotors operating above critical speed, the bearings are usually lubricated with circulating oil. In the case of high-speed ball or roller bearings, this lubricating oil is often circulated through an annular space in the housing that separates the non-rotating bearing ring from the main housing of the machine, so that the radial load on the bearing squeezes this oil film. Vibrations of the rotor are dampened by viscous flow of the oil film as the rotor passes through critical speeds while accelerating and decelerating from its operating speed.

In currently available rotating machinery it is common to use "squeeze-film" dampers and precision balanced rotors to control vibration response and bearing loads in high speed rotating machinery. Unfortunately, squeeze-film dampers have their own instabilities due to oil whirl and oil whip and often induce instabilities in such high speed machinery. Additionally, squeeze-film damper design is an ill-defined art. Furthermore, squeeze-film dampers do not provide high damping ratios. Hence, high vibrational bearing loads and system instabilities often result when squeeze-film dampers are utilized.

SUMMARY OF THE INVENTION

In one of its many aspects this invention provides woven fabric composite flywheel rings. Embraced within the invention respecting such rings are circumferential, polar-wound and other woven-fabric continuous-fiber-reinforced composite flywheel ring designs, as well as low-technology unbonded continuous high-strength-steel wire and other filament flywheels, and their mounting systems. Flywheels made according to the flywheel aspect of this invention may be fabricated by filament winding with either wet or dry winding processes being used, by resin transfer molding, by injection molding and by autoclave or vacuum/pressure bag processes. Such autoclave and vacuum/pressure bag processes are amenable to pre-pregnated materials.

In another of its many aspects this invention provides for integration of such woven fabric composite flywheel rings and other types of flywheels as mentioned immediately above with space-vector, sine-wave-drive, digital signal processing-controlled, compact, sensorless-commutated, either longitudinal or transversal-flux, radial or axial gap motor/generators with or without permanent magnets, the latter of which are referred to as reluctance designs, in high-efficiency flywheel energy storage systems using solid-lubricated ball, roller and other bearing assemblies, together with permanent-magnet non-flux-penetrating thrust compensators requiring little or no conventional periodic re-lubrication or maintenance. In another of its many aspects the invention provides heat pipe-cooled bearings and motor rotors, fail-safe rapid energy dump systems, and lubrication facilitating geometries for ball, roller and sliding bearings, as well as vibration-decoupling mounting systems in high-speed super-critical flywheel energy storage systems, allowing the rotor to spin about its mass center thereby to minimize bearing loads during high-speed operation and thus increase system life, reliability and safety.

In yet another one of its many aspects, the invention provides polar-woven bi-annular high-temperature carbon-carbon or other woven fabric composite flywheel rings which may be mounted on a rotor by a hub with curvature modifications at the spoke-rim interface. The wheel may have scallops in the center of each web to reduce the centrifugal stresses in the assembly.

Flywheel rings may be mounted directly onto split-back-iron motor/generator rotors, either with permanent magnets or a reluctance type device without magnets, providing naturally-occurring field weakening from the increase in the circumferential gap between each split backiron segment resulting from centrifugal separation as speed increases.

In yet another of its many aspects the invention embraces use of metal matrix and fiber composite flex-rim hub materials, both of which offer performance compatible with high performance rotors without loss in proven stability and tracking capability. These materials provide flexibility in the size of the flywheel hub as to both diameter and length, selective area reinforcement, and low cost manufacture in large volume production.

In yet another of its many aspects this invention provides sensorless commutation of a motor/generator using a virtual Hall effect system.

In yet another of its many aspects this invention provides magnetic damping incorporated into an extension of the bearing mount to limit amplitude of vibration.

In still another of the many aspects of this invention a self-contained cooling system for a high speed flywheel energy storage system includes a heat pipe in the shaft portion of the apparatus to provide cooling for the high heat generated by the motor/generator and bearings.

Still additional aspects of this invention embrace use of both longitudinal and transverse-flux motors with either axial or radial gap designs and digital space vector sine wave drive and vector control.

In the aspect of this invention involving the composite flywheel rings, each such ring in either a single or multiple-ring rotor may preferably be comprised of at least two separate composite rings thermally shrink-fitted together and made of different compositions. The different compositions may include carbon/carbon composites which minimize thermally-induced rotor failures since such materials operate at very high temperatures without weakening. Pyrolysis of the carbon/carbon composite matrix in manufacturing also minimizes outgassing as well as the resulting potential for overpressure, combustion and explosion in the event of rotor failure.

Another important aspect of this invention is the critical sequence and special schedule of variable fiber tensioning used during the winding and curing of certain of the composite flywheel rings. Either circumferential filament, wet or dry, wound or combination radial polar woven composite rings may be used together with such tensioning to create a desirable pattern of residual stress in the completed ring to counteract centrifugal and thermal stresses generated when these rings are used in complete flywheel energy storage systems.

Mounting hubs for such flywheel rings may use a revised curvature of the interface between the spokes and the rim and a thicker section in the center of the rim between the spokes.

Alternative materials for these hubs, such as metal matrix and fiber composites, provide great flexibility in hub design as well as lower cost in manufacture. Use of metal matrix or fiber composite hub materials is desirable so that centrifugal expansion of the hubs at high speeds does not exceed the maximum rotor mounting thermal interference possible with differential temperatures and thermal expansivities.

Yet another aspect of this invention is provision of alternative composite ring mounting methods and apparatus for very high specific energy density flywheels.

In the aspects of this invention involving the motor/generator and controller, extremely compact electromechanical machines have maximum efficiency for minimum energy losses and heat generation, as well as heat removal management of whatever unavoidable residual heat generation occurs in either the rotor or the stator. For this reason, the apparatus may be equipped for separate temperature measurement and water cooling of the motor stator and motor rotor through radiation fins in the vacuum enclosure, as well as the bearings and the flywheel ring itself. In one embodiment a self-contained heat-pipe cooling system is incorporated into the complete flywheel energy storage system.

In various manifestations of the motor/generator aspect of this invention, both longitudinal and transverse-flux electromagnetic designs are used with either radial or axial-gap configurations to minimize both rotor and stator heating and to maximize efficiency.

In yet another aspect of this invention, the structure of the transverse-flux permanent magnet motor is significantly simplified for greater reliability. This is extremely important for flywheel energy systems of the type to which this invention relates in that long life without periodic maintenance is a necessity.

In yet another aspect of this invention, virtual Hall effect signals are generated in the controller. In this case, no rotor position feedback sensors are required in the motor, resulting in sensorless commutation, reducing cost and increasing reliability. Permanent magnets in the rotors normally used in such DC motors may be eliminated using a reluctance-type design.

Motor/generators of the flywheel energy systems of this invention may have incorporated into their controllers a special circuit for high speed stators having extra windings for rapid extremely-high-power dumping of the stored energy in the flywheel in a benign manner.

For very high speed composite flywheel rings, for which conventional mounting hub designs are not suitable, an alternative motor rotor may be used. In this aspect of the invention there may be provided axially split or partially split backiron segments thermally fitted with a stationary interference fit inside the bore of these rings. As assembly speed is increased, this interference fit disappears due to centrifugal expansion, and a small gap forms between the edges of each split backiron segment. The small gap causes field weakening, reduced current and pulse-width modulation in the motor, increasing efficiency and reducing rotor heating. In the aspect of the invention relating to the axially split or partially split backiron, the rotor portion of the motor/generator apparatus may be defined by an axially elongated shell having an outer cylindrical central portion within which the proponent magnets are mounted, an inner cylindrical central portion connected to a rotatable shaft and an intermediate portion connecting the inner and outer cylindrical central portions for facilitating continued unitary rotation of the outer cylindrical central portion with the flywheel as rotation rate of the flywheel and the shaft approaches the rate at which the flywheel separates from the shaft. In this aspect of the invention the intermediate portion is preferably curved and further is preferably thinner than the inner and outer cylindrical central portions.

In this aspect of the invention the flywheel is preferably mounted on the exterior of the outer cylindrical central portion of the shell. Preferably the shell has axially elongated slots therein between adjacent ones of the permanent magnets. Preferably the slots are in the cylindrical portion of the shell. Further preferably extremities of the slots are axially inboard of axial extremities of the permanent magnets. Some of the slots may be at a common angular location so as to be axially aligned. It is also within the purview of the invention for extremities of at least some of the slots to be outboard of axial extremities of the permanent magnets.

Another aspect of this invention is the use of digital space vector sine wave drive in the digital signal processing based electronic motor/generator controls, which reduces losses and heating and improves dynamic performance. This vector control and the field weakening phenomenon optimize the power factor in utility applications, minimize the size, weight and cost of the power electronics and thereby improve overall system efficiency.

In an aspect of this invention involving bearings, the bearing assembly includes an outer bearing ring, and an inner bearing ring with the inner and outer bearing rings including races for retaining balls or rollers of the bearing assembly. The bearing assembly may yet further include a plurality of balls or rollers journaled for rolling contact with respective races of the outer and inner-bearing rings and solid lubricant biased against one or more of the balls-or rollers journaled between the inner and outer rings, with the inner and outer rings connected to load-applying or load-carrying members. The solid lubricant member may also be contained within the dimensional envelope of a sliding bearing ring configuration without the plurality of balls or rollers.

In the bearing and friction moderation and control aspect of the invention in the high vacuum environment in which the flywheel energy storage system operates, a low-volatility synthetic grease may be optimally used as an adjunct lubricant. The adjunct lubricant may be provided using a porous plastic element such as a Nylon insert impregnated with the same low-volatility oil that is used in connection with the synthetic grease to keep the lubricating grease wet and prevent drying in the vacuum. The lubricant, bearing and friction control aspects of this invention include use of tortuous labyrinth seals to limit residual outgassing of the low-volatility grease to acceptable levels.

The solid lubricating member in the bearings is preferably carbon graphite and is preferably biased, occasionally self-biased, against the bearing balls, rollers or other moving surfaces so that the graphite "writes on", i.e. rubs against, the bearing balls, rollers or other moving surface(s), leaving a thin graphite lubricating film thereon and producing an ultra-fine particulate "wear debris" of solid lubricating material. As the bearing operates, this wear debris is caught between the balls or rollers and the race surfaces. The wear debris is carried by the rotating balls or rollers to the race surfaces against which the balls or rollers are journaled so that a graphite film forms between the balls or rollers and the race surfaces and the film is continually replenished for the life of the bearing, without subsequent need to apply additional lubricant.

At low bearing speeds, the self-biasing effect in these solid-lubricant rings may be provided by the elasticity of the rings themselves as a result of the rings being split and made so that they are loaded lightly by deflection against the balls or rollers. In the case of roller bearings, and at higher bearing speeds for ball bearings, the inertial loads on the bearing elements and on the solid lubricant rings, which solid lubricant rings for such applications are preferably made without any split, are enough to provide sufficient biasing or occasionally contact against the balls or rollers to produce the required solid lubricant debris and transfer films. In the high speed flywheel energy storage system the balls move randomly to impact the solid-lubricant rings. When roller bearings are used the rollers skew randomly against solid-lubricant rings built into such bearings to contact the roller ends.

The lubricating member is preferably in the form of a ring but can also be in the form of inserts of solid-lubricant material or a relatively thick solid-lubricant coating bonded on the cage. Position of the solid lubricant may vary. The ring or cage is to exert minimal restraint on the orbiting motion of the balls or rollers. Minimum orbital restraint is required to minimize solid-lubricant film wear on the ball or roller/raceway surfaces in the bearing.

For very high speed applications, when the centrifugal forces on the solid lubricant rings or cage are high enough to cause excessive wear and stresses, a metal band may be used to contain the stresses in the solid lubricant ring. Alternately, a cage or separator may be used, with solid-lubricant material incorporated as inserts or coatings on the surfaces of the cage contacting the ring guide lands and the balls or rollers. As with the solid lubricant ring, in order to minimize orbiting restraint of the balls or rollers, the cage pocket clearances are large in the orbiting direction and the guide lands have low clearance and friction.

The required low friction of the cage guide-land surfaces may be provided by low-friction hydrodynamic or gas-lubricated step-bearing or similar geometry on the cage guide lands. The desirable self-acting hydrodynamic lubrication of these cage land surfaces is facilitated by centrifugal warping of the cage rails at high speeds from the radially outward deflection of these rails at each cage bar between each ball or roller pocket in the cage, providing a scalloped-shape cage-land sliding surface for tapered-land hydrodynamic lubricant film formation.

Very thin bonded solid-lubricant coatings on the balls or rollers and races may be provided for initial run-in lubrication of the contacting surfaces in the bearing, until the transfer-film and wear-debris entrapment mechanisms build and provide continuous film replenishment for long bearing life. The solid-lubricant elements are positioned in the bearings in a way to avoid high loads on the solid-lubricant film replenishing surfaces; otherwise and undesirably, large particles would wear off with concomitant failure to produce the needed consistent supply of sub-micron wear replenishment particles.

The invention preferably uses somewhat open conformity of ball bearing raceways or crowning of roller bearing contacts, to allow sufficient space near the load-carrying contacts in the bearings for solid-lubricant film channelling. At the same time, geometry of the bearing raceways avoids excessive edge contact that could disrupt the lubricant films on the contacting surfaces. All of this assists in the wear-debris entrapment and transfer of solid-lubricant films directly onto the tracks of the ball, roller or slider contacts and at the same time does not significantly restrain the orbiting motion of the rotatable elements in the bearings.

In the flywheel energy storage systems of the invention, the predominant radial load on the bearings is a residual imbalance load that rotates with the rotor, while the predominant thrust load is the preload usually provided by springs acting against stationary-bearing rings. These stationary bearing rings are desirably mounted on the stationary part of the structure with a sliding fit.

While impregnated carbon-graphite is the preferred material for the solid lubricant, other candidate materials include molybdenum disulfide, tungsten disulfide and second generation complex metal chalcogenides, which are specially adapted for high-temperature bearing performance. These solid lubricant material formulations, like the preferred carbon-graphite, can be incorporated into self-contained solid-lubricant compacts and coatings and used in the bearings of the invention.

In yet another aspect of this invention, the rotating ring is mounted on the flywheel energy storage system rotor using a flexible coupling device that effectively changes the critical rotor speed as the rotor accelerates up to select design speed. In the manner the bearings are never subjected to the high unbalance loads such as occur at the critical speed of a conventional rotor.

This vibration isolation is achieved by an annular contact space between the rotor and the rotating bearing ring being bridged by a flexible decoupling element such as an elastomeric O-ring or a vulcanized elastomeric element or a flexible metallic element having suitable compliance. The annular space does not exist at start-up since the parts fit together tightly when the rotor is stationary, the parts separate and the annular space opens by centrifugal deflection of the outer member of the assembly to form a gap at an intermediate rotor speed. This "lift-off" speed is selected to be approximately two-thirds of the first rotor critical speed when the gap or annular space does not exist and approximately one-third higher than the modified critical speed when the gap or annular space has been created. In this manner the rotor never runs right at the critical speed and thus never subjects the bearings to the high vibration amplitude(s) that would result from dry, undamped operation at the rotor critical speed(s).

Rotors with this vibration-minimizing decoupling system, when operating at speeds above the lift-off speed, rotate around the mass center instead of the geometric center of the bearing support system. As a result, need for high precision balancing of the rotor is reduced and there is little or no centrifugal warping of the precision bearing mounting fit surfaces. This is particularly important for high-speed fiber composite flywheel rings, in which centrifugal growth may be large, since such systems retain the radial compatibility of such rings as well as the precision balance of the system over the wide operating speed range of the flywheel energy storage system.

In the aspect of the invention relating to the vibration minimizing rotary machinery decoupling system, the invention further embraces coupling apparatus facilitating passage of an acceleratingly rotating body through a critical frequency of rotation where the apparatus includes a pair of mating first and second portions of the body with the portions contacting when the body is stationary. The apparatus further includes means for flexibly coupling the second portion to the first portion to facilitate continued substantially unitary rotation thereof as the second portion moves away from the first portion responsively to centrifugal force at rotational speed below the critical frequency. Desirably, the two portions contact with an interference fit when the body is stationary and at room temperature. Further desirably the mating surfaces are mutually facing when the second portion moves radially away from the first portion responsively to centrifugal force at rotational speed below the critical frequency.

In the vibration-minimizing decoupling aspect of the invention there is further embraced a method for accelerating a rotating body through a critical frequency of rotation with the body having a second portion tending to separate from a first portion at body angular velocity below the critical frequency. The method includes permitting the second portion to move away from the first portion responsively to centrifugal force at rotational speed below the critical frequency thereby reducing effective mass of the rotating body and establishing a new critical frequency for the rotating body substantially shifted downwardly from the original critical frequency, the second portion is then preferably connected to the first portion only by a flexible element, thereby increasing the effective compliance of the bearing support of the rotating body. The method further embraces optionally maintaining a flexible couple between the first and second portions to facilitate substantially unitary rotation thereof at common velocity but with separate angular momenta. The method may further optionally include the step of permitting the second portion to self-bias itself radially inwardly to effectuate complemental contact between facing surfaces of the first and second portions when the body is at rest and at ambient temperature.

The vibration-minimizing rotor decoupling system aspect of the invention has applicability not only to flywheel energy storage systems of the type to which this invention broadly pertains but also to other high speed rotating machinery such as gas turbine engines, power generators and the like. It is further within the purview of this invention respecting the vibration-minimizing rotor decoupling apparatus and method to incorporate some damping into the system. This can be accomplished by modifications to the basic apparatus disclosed herein by, for example, utilizing a fully sealed viscous fluid-filled cavity in the apparatus and defining the area of separation within the body upon angular acceleration or by utilizing elastometric interfaces in the cavity in the body to provide the required damping. These approaches are consistent with high speed flywheel energy storage system vacuum requirements and other equipment requiring non-contaminating operating environments when such units are fully sealed.

In addition to the desirable characteristics of such vibration-decoupling systems for any type of high-speed rotor, such systems are equally applicable to any type of bearing and lubrication system, including air-oil mist, circulating oil and grease lubrication, and solid-lubrication systems.

It is further within the purview of the vibration-minimizing rotary machinery decoupling system to use such system and the approaches of this invention in systems where high torques must be transmitted and centrifugal loading is or may be inadequate; in these cases a splined or non-circular lobed mount can be employed to provide the desired decoupling and consequent greatly improved system stability. These applications are most likely in direct rotor/shaft assemblies where the radial distance to the interface is small.

In any of the configurations of the vibration-minimizing rotor decoupling system within the purview of this invention the elastic element is desirably mounted in the rotor assembly and hence not subjected to running frequency cyclic loading.

In one aspect of the invention the rotor of the means for selectively rotating the flywheel responsively to electrical power input or producing electrical power upon rotation thereof by the flywheel may be in the form of an axially elongated shell which includes an outer cylindrical central portion within which permanent magnets are mounted, an inner cylindrical central portion connected to the rotatable shaft and an end portion connecting the inner and outer cylindrical central portions for facilitating continued unitary rotation of the outer cylindrical central portion with the flywheel as rotation rate of the flywheel and the shaft approaches a rate at which the flywheel separates from the shaft. Desirably, the end portion is curved. Further desirably an intermediate portion between the end portion is thinner than the inner and outer cylindrical central portions. Still further desirably the flywheel may be mounted on the exterior of the central cylindrical portion of the shell.

The shell may have axially elongated slots therein between adjacent ones of the permanent magnets. The slots are preferably located in the cylindrical portion of the shell. Extremities of the slots may be axially inboard of the axial extremities of the permanent magnets. Some of the slots may be at common angular location so as to be axially aligned. Extremities of some of the slots may be outboard of axial extremities of the permanent magnets.

BRIEF DESCRIPTION OF THE DRAWINGS

FIG. 17 is a cross-sectional view showing a shaft, a bearing and a bearing assembly including inner and outer rings and bearing balls mounted about the shaft, illustrating another embodiment of the vibration-decoupling aspect of the invention.

FIG. 18 is view of the structure shown in FIG. 17 illustrating vibration-decoupling.

FIG. 26 is a sectional schematic view, partially broken away, of yet another embodiment of apparatus facilitating passage of an acceleratingly rotating body through a critical frequency of rotation, manifesting aspects of the invention.

FIG. 27 is a sectional view of the structure of FIG. 26 illustrating operation of the structure after lift-off.

FIG. 28 is an end view, partially broken away, of a rotatable member illustrating a high torque spline attachment of rotating bodies using the vibration-decoupling aspect of the invention.

FIG. 29 is an end view, partially broken away, of a rotatable member illustrating a high torque, non-circular lobe arrangement utilizing the vibration-decoupling aspect of the invention.

DESCRIPTION OF THE PREFERRED EMBODIMENTS AND BEST MODE KNOWN FOR PRACTICING THE INVENTION

Figure 1:
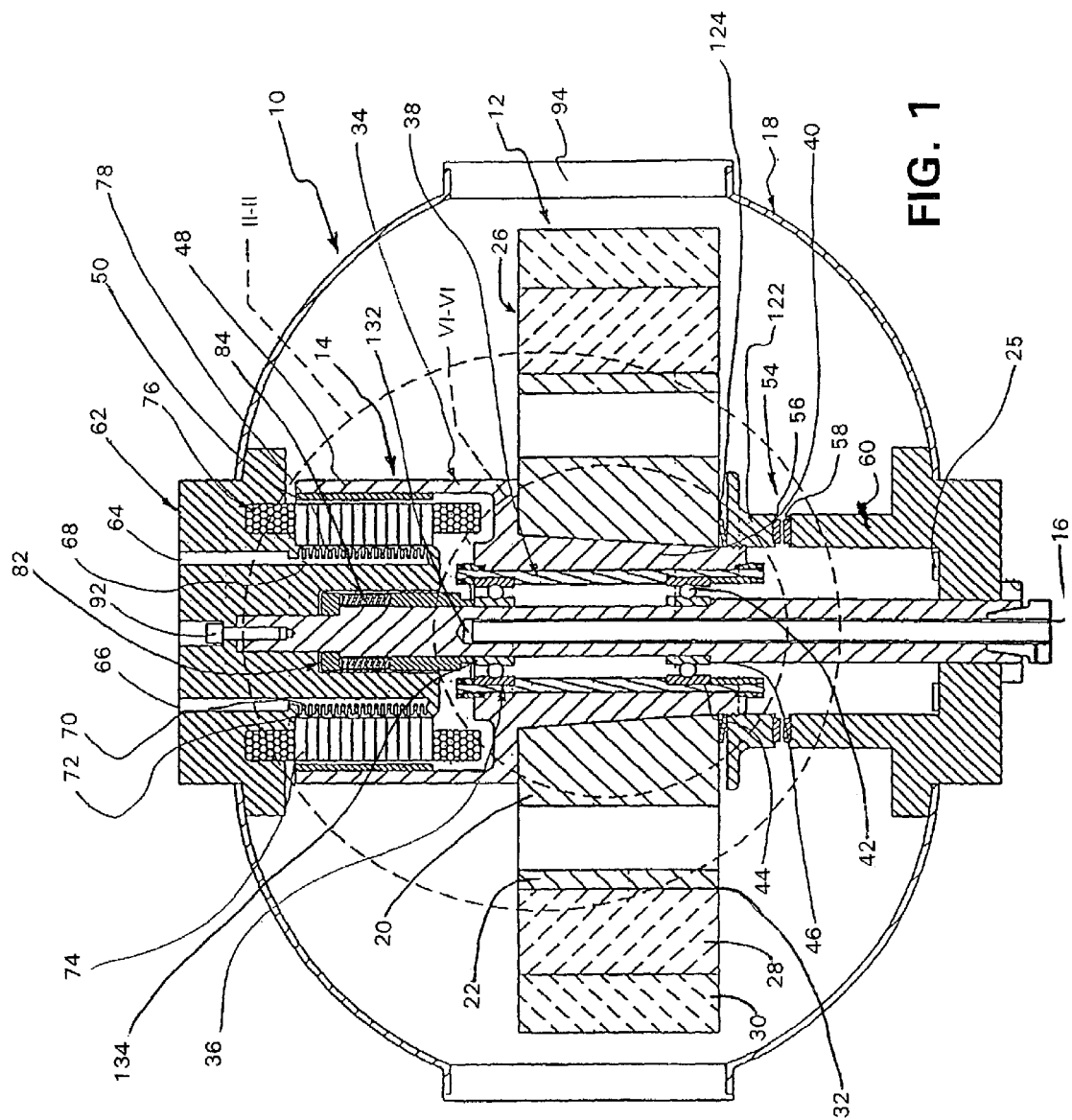
FIG. 1 is a cross-sectional view of a first embodiment of a flywheel energy storage system manifesting aspects of the invention.

Referring to the drawings in general and to FIG. 1 in particular, a flywheel energy storage system manifesting aspects of the invention and representing a first preferred embodiment of the invention is illustrated generally in FIG. 1 and designated generally 10. Flywheel energy storage system 10 includes a flywheel which has been designated generally 12, a motor/generator which has been designated generally 14 and which provides means for selectably rotating flywheel 12 responsively to electrical power input to motor/generator 14 or for producing electrical power upon rotation of a rotor portion of motor/generator 14 by flywheel 12.

Flywheel energy storage system 10 further includes a shaft designated generally 16 which is stationary in the embodiment illustrated in FIG. 1 and about which flywheel 12 and the rotatable portion of motor/generator 14, referred to as the rotor, rotate.

Flywheel energy storage system 10 further preferably includes a vacuum enclosure designated generally 18 in FIG. 1. Flywheel 12, motor/generator 14 and shaft 16 are preferably enclosed within vacuum enclosure 18. Suitable electrical connections are provided into and out of vacuum enclosure 18 to provide electrical power to motor/generator 14 in order to drive motor/generator 14 and accelerate flywheel 12 to a high rotational speed in order to store energy therein. Similarly, electrical connections from motor/generator 14 are provided for when motor/generator 14 is acting as a power generator and generating electrical power in response to being rotatably driven by flywheel 12. Of course, suitable controls are provided for motor/generator 14. These electrical connections and controls for motor/generator 14 are not illustrated in FIG. 1 to enhance drawing clarity.

Flywheel 12 preferably includes a hub 20 and a rim 22 connected to hub 20 by spokes, not illustrated in FIG. 1, which provide rigid structural connection between hub 20 and rim 22.

Mounted on rim 22 is a ring designated generally 26 and referred to herein as a bi-annular ring. Ring 26 is bi-annular in the sense of preferably including an inner or first annular ring portion 28 mounted directly on rim 22 and an outer or second ring portion 30 mounted on the outer periphery of inner ring 28 and being in complemental engagement therewith.

Inner or first annular ring portion 28 is preferably mounted inside the second ring 30 using a differential thermal expansion assembly. Specifically, ring 28 is cooled in order to cause ring 28 to contract. The assembly is then mounted over rim 22, which is preferably aluminum or an aluminum alloy.

Once the heating and cooling are completed, rim 22 is fitted within bi-annular ring 26 and the assembly is permitted to cool to room temperature. At room temperature these parts are in an interference fit and the interference fit tightly retains bi-annular ring 26 on rim 22. The same approach is preferably used to assemble bi-annular ring 26 consisting of inner ring 28 and outer ring 30. The differential thermal expansion assembly approach results in a tight interface 32 between rim 22 and first ring portion 28 having exceedingly high internal pressure exerted by rim 22 towards ring 28 and vice versa.

Flywheel 12 and specifically hub portion 20 thereof is mounted on a spool 34, rotation of which respecting shaft 16 is facilitated by bearing assemblies 36. Only certain ones of bearing assemblies 36 have been numbered in FIG. 1 to aid drawing clarity. Individual component parts of bearing assemblies 36, such as the bearing balls and bearing inner and outer rings, have not been numbered in FIG. 1 to aid drawing clarity. These parts are shown in greater detail in other drawings and are numbered therein.

Spool 34 has a central hub portion 40. Inboard of central hub portion 40 is an annular sleeve 38 which is connected to the outer rings of bearing assemblies 36 for rotation therewith about shaft 16. Bearing assemblies 36 including bearing balls 42, outer bearing rings 44 and inner bearing rings 46. These bearing assemblies are illustrated in greater detail in FIGS. 5, 6, 7, 8 and 9 but even in those figures not every one of bearing balls 42, outer bearing rings 44 and inner bearing rings 46 have been numbered, in order to enhance drawing clarity.

Spool 34 includes an annular extension portion 48 which extends vertically upwardly and, together with permanent magnets 50, defines the rotor portion of motor/generator 14 providing means for selectably rotating flywheel 12 responsively to electrical power input or producing electrical power upon rotation thereof by flywheel 12. Permanent magnets 50 are mounted within annular extension 48 and are spaced angularly thereabout.

At the bottom of the vacuum enclosure 18, providing support for stationary shaft 16, is a bottom vertical support member designated generally 60. A corresponding top vertical support member 62 also forms a portion of vacuum enclosure 18 and, together with bottom support member 60, retains shaft 16 in its vertical position illustrated in FIG. 1.

Bottom vertical support member 60 provides upward support for a stationary annular ring magnet 58 which is positioned to oppose magnetic force exerted by a rotating annular ring magnet 56 mounted on the bottom portion of a balance ring 122 portion of spool 34. These two magnets are of the same polarity and thereby exert force opposing one another; this opposition results in bottom vertical support member 60 effectively supporting the weight of the rotating assembly consisting of flywheel 12 and the rotatable portion of motor/generator 14 thereby relieving bearing assemblies 36 from receiving a substantial thrust load from the weight of flywheel 12 and motor/generator 14.

Top vertical support member 62 includes a cooling water inlet passageway 64 and a cooling water outlet passageway 66. Passageways 64, 66 connect with an annular cooling water reservoir 68 formed within top vertical support member 62.

A radially outwardly facing surface of reservoir 68 is formed with a plurality of cooling fins 72 thereon. These cooling fins are in close proximity to a stator portion of motor/generator 14 and serve to transfer heat, received by radiation from the stator portion of motor/generator 14, by fluid convection into cooling fluid, preferably water, retained within an annular cooling water reservoir 68 in top vertical support member 62.

The stator portion of motor/generator 14 is defined by a series of vertically facingly contacting annular rings 74 which are visible in FIG. 1 but which have not been sectioned in order to aid clarity of the drawing. Rings 74 are coaxial with shaft 16 and with the axis of rotation of flywheel 12 and the rotatable portion of motor/generator 14. Apertures are formed in annular rings 74 for residence therewithin of motor winding 76 as illustrated generally in FIG. 1.

Figure 10:
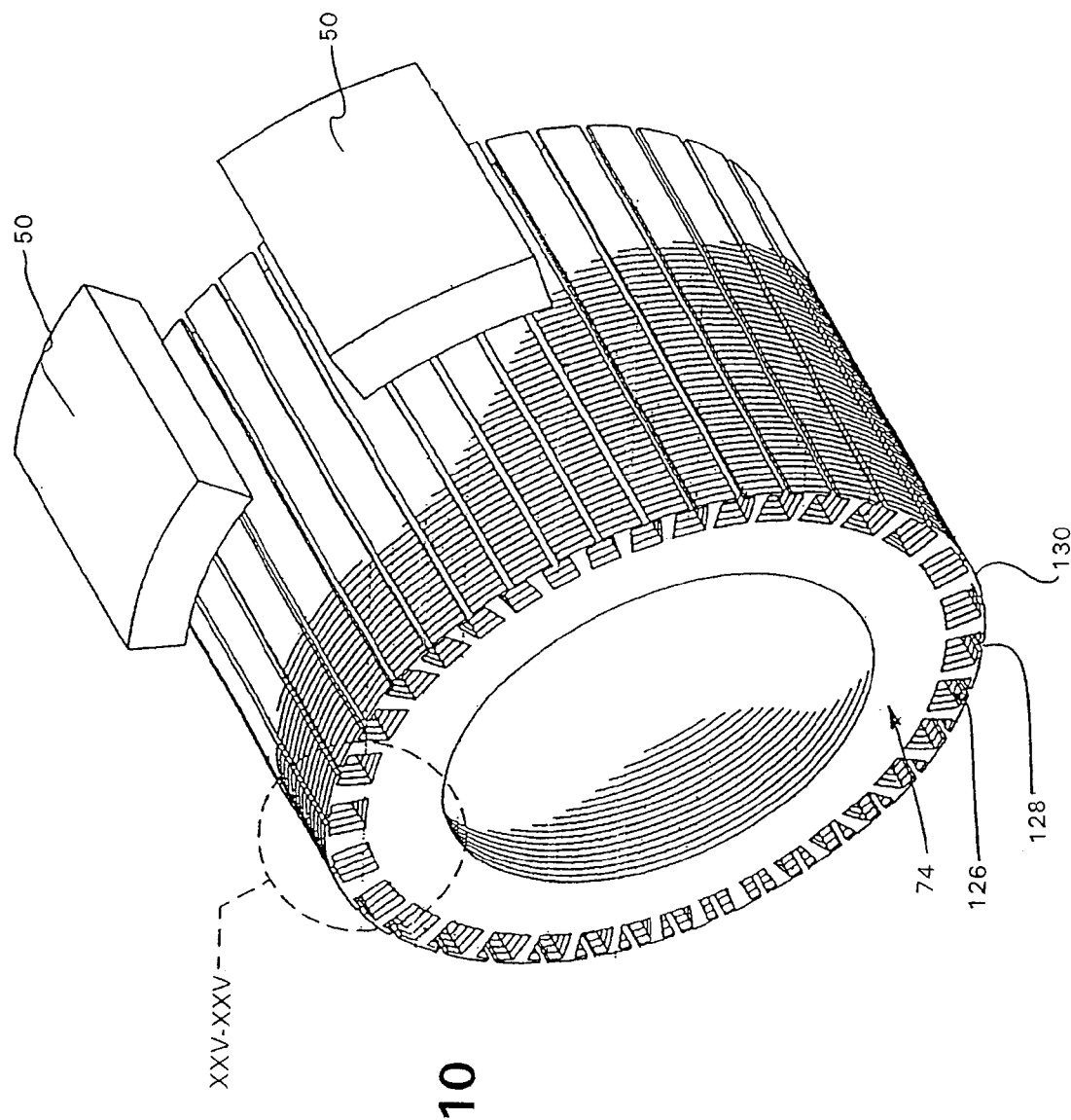
FIG. 10 is an isometric view of stator disks and permanent magnets forming a portion of a motor/generator assembly manifesting aspects of the invention.

The stack of annular rings 74 forming a portion of the stator of motor/generator 14 is illustrated in FIG. 10. Residence of motor windings 76 within apertures formed in annular ring 74 is illustrated in FIG. 25.

Figure 25:
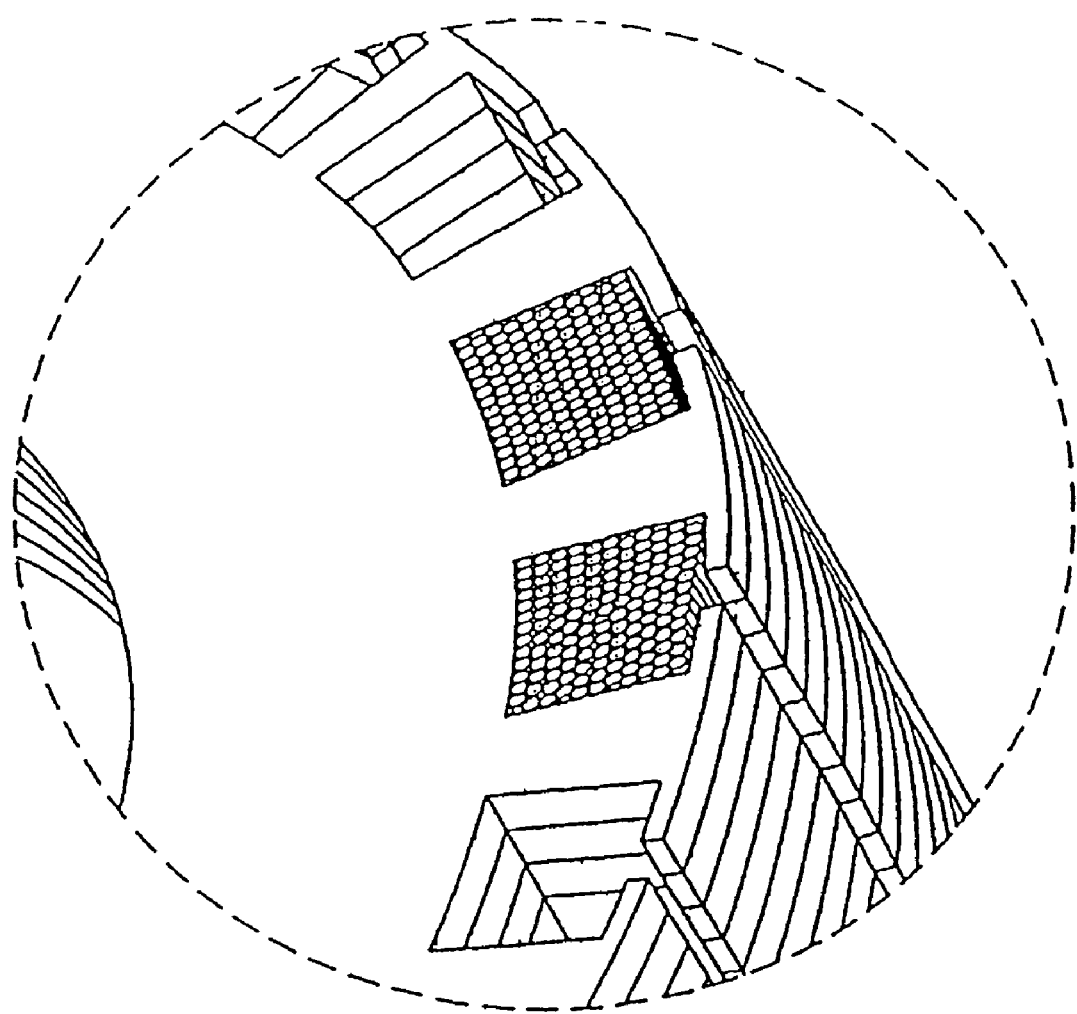
FIG. 25 is an enlarged isometric view of a portion of the structure illustrated in FIG. 10, taken at circle XXV—XXV in FIG. 10.

As best illustrated in FIGS. 10 and 25, the stator portion of motor/generator 14, which preferably is a brushless, inside-out radial gap DC motor/generator, is fixedly connected to shaft 16 and includes a plurality of co-axial contacting annular rings 74. Each ring 74 has a series of circumferentially spaced apertures therethrough proximate the ring outer periphery, which has not been numbered in FIGS. 10 and 25. The apertures in the rings or ring 74 are substantially rectangularly shaped in the plane of each ring. Each aperture communicates with the ring periphery via a radially disposed channel formed in the ring periphery. Apertures and channels formed in the rings 74 are axially aligned, with the rings having open centers and, as illustrated in FIG. 1, being coaxial with flywheel 12.

The windings 76 occupy and interconnect the rectangular apertures and run the axial length of the coaxially contacting rings 74. In FIG. 10 one of the rectangular apertures has been designated generally 126. One of the channels via which rectangular apertures 126 communicate with the ring periphery and hence with the exterior of the stator has been designated 128 in FIG. 10. The periphery of one of the ring or rings 74 has been designated 130 in FIG. 10.

Also illustrated in FIG. 10 are two permanent magnets 50 forming a portion of the rotor of motor/generator 14.

Referring again to FIG. 1, bottom vertical support member 60 not only bears the weight of the rotating flywheel and rotating portion of motor/generator 14, bottom vertical support member 60 additionally retains shaft 16 therewithin against rotation.

As illustrated in FIG. 1, shaft 16 includes a central bore 132 opening into a shaft 16 from the bottom thereof. This central bore 132 is for supply of cooling fluid, preferably liquid and most preferably water, to the interior of shaft 16. Bore 132 within shaft 16 preferably extends axially sufficiently far along the length of shaft 16 so as to pass in close proximity to both lower and upper ones of bearing assemblies 36. Presence of cooling fluid, preferably water, in bore 132 within shaft 16 provides a sink for heat generated in bearing assemblies 36 as flywheel 12 and the rotatable portion of motor/generator 14 rotate at exceedingly high speed.

Extending annularly around the interior and forming a part of vacuum enclosure 18 is a crash guard 94. As illustrated in FIG. 1, crash guard 94 preferably extends vertically above and below the vertical extremities of flywheel 12 so that upon any failure of flywheel 12 or the support structure for flywheel 12, whereby centrifugal force would cause flywheel 12 or parts thereof to fly radially outwardly, these parts encounter crash guard 94 and are retained within vacuum enclosure 18 by contact therewith.

Figure 2:
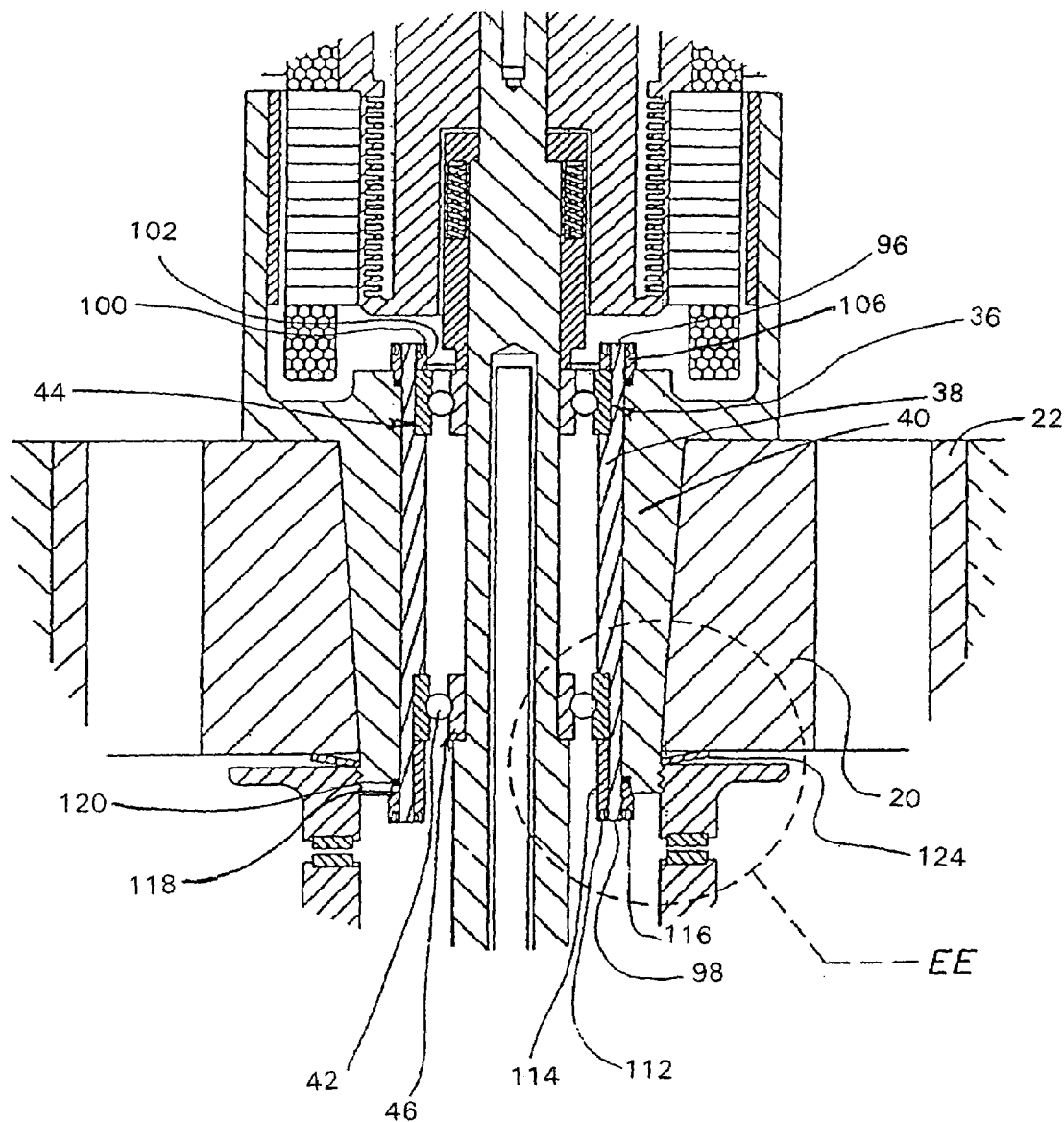
FIG. 2 is an enlarged view of the structure illustrated in FIG. 1 taken at circle II in FIG. 1.

A spanner nut 116 is internally threaded and engages externally facing threads formed about the radially outwardly facing lower extremity of annular sleeve 38. Similarly to spanner nut 106 located at the upper extremity of annular sleeve 38, fourth spanner nut 116 may either be equipped with an axially extending portion 118 or may bear upon a shim having the same shape as axial extension 118, to bear upon and retain in place a second O-ring 120 which resides in a recess defined by a downwardly facing shoulder formed in central hub 40 and by the radially outwardly facing surface of annular sleeve 38. This recess is illustrated in FIG. 2.

During operation of the flywheel energy storage system according to the invention, as the flywheel and the rotatable portion of the motor/generator accelerate angularly, centrifugal force in the flywheel urges the flywheel outwardly. As the flywheel and rotatable portion of the motor/generator continue to rotate, those components approach a critical or resonant frequency at which extremely high amplitude vibration occurs.

In the flywheel energy systems according to this invention, centrifugal force on the rotating parts causes the flywheel central hub 40 to separate from annular sleeve 38 at the region of contact therebetween. This phenomenon is illustrated in FIGS. 6, 7, 8 and 9. Specifically, in FIGS. 6 and 8 the flywheel energy system according to the invention is shown with the flywheel central hub 40 in facing contact with annular sleeve 38. This is the configuration of annular sleeve 38 and central hub 40 at speeds well below the critical or resonant frequency.

Figure 7:
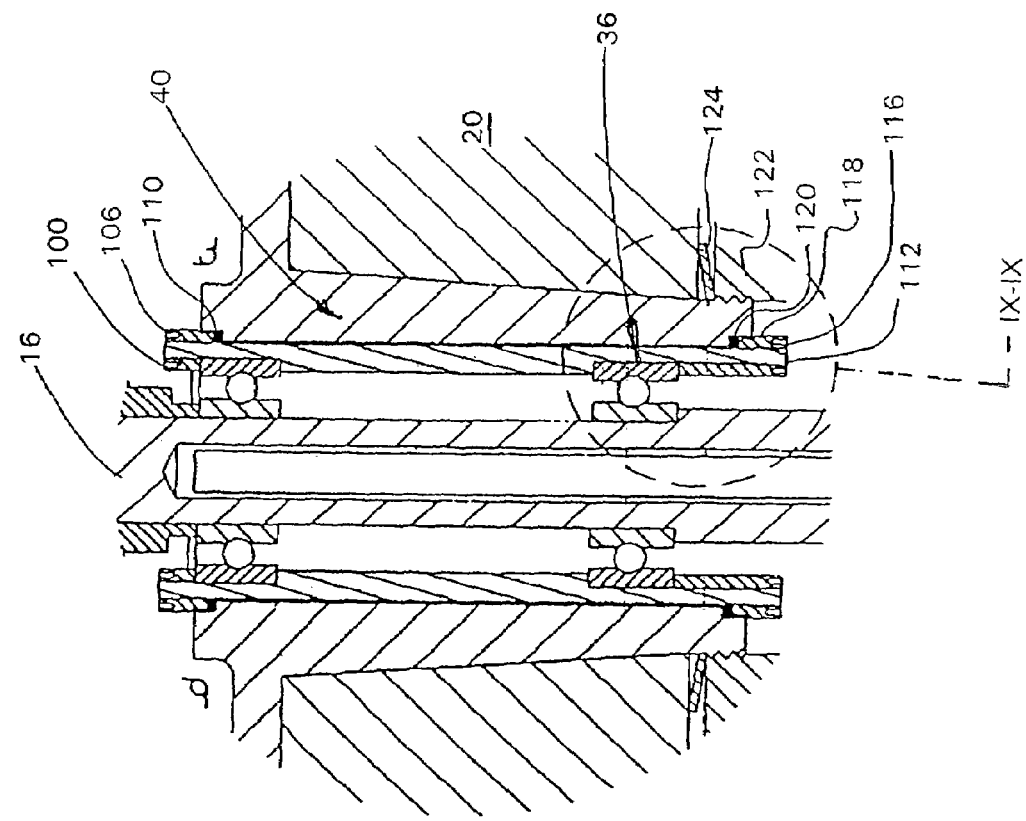
FIG. 7 is a sectional view of the structure illustrated in FIG. 6 when the flywheel is rotating and the vibration-decoupling apparatus of the invention is actuated to reduce the critical speed of the flywheel assembly.
Figure 9:
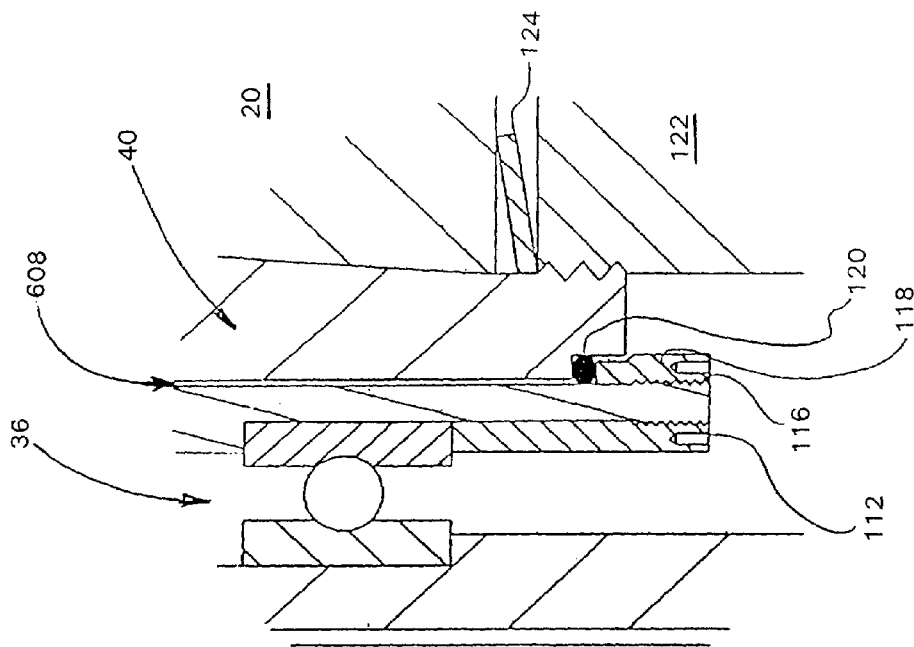
FIG. 9 is a view of the structure illustrated in FIG. 8 showing the structure when the vibration-decoupling apparatus of the invention is actuated as a result of the flywheel rotating.

FIGS. 7 and 9 illustrate the configuration of the flywheel energy storage system and specifically annular sleeve 38 and central hub 40 with a small gap or clearance having formed therebetween as central hub 40 has moved radially outwardly from annular sleeve 38. First and second O-rings 110, 120 provide a continuing elastic couple between the inner rotating member defined by annular sleeve 38 and the outer rings of upper and lower bearing assemblies 36, and the outer rotating member defined by spool 34, flywheel 12 and the parts associated therewith.

When separation occurs as illustrated in FIGS. 7 and 9, the reduced spring constant of the bearing support system for the rotating assembly defined by spool 34 and flywheel 12 and the parts rotating unitarily therewith has a critical frequency which drops relative to the critical frequency of the rotating parts when spool 34 and flywheel 12 were in tight engagement with sleeve 38. When the gap opens, the O-rings provide the only connection between annular sleeve 38 and central hub 40 of spool 34 so that the critical speed of the rotating assembly defined by spool 34 and flywheel 12, and the parts rigidly connected thereto and rotating therewith, and the critical speed of the rotating assembly defined by annular sleeve 38 and the outer rings of the upper and lower bearing assemblies 36, drop below the respective rotational speeds of these two assemblies. The first and second O-rings 110, 120, carrying substantially no load and providing an elastomeric couple between the inner and outer rotating assemblies, have an extremely long lifetime.

Spool 34 further includes a balance ring 122 at its lower extremity. Balance ring 122 houses rotating annular ring magnet 56 and threadedly engages the lower portion of central hub 40 as illustrated in FIG. 1.

Balance ring 122 is equipped with balance screws, not illustrated in FIG. 1, which facilitate dynamic balancing of the assembled rotor. A bevel washer 124 retains balance ring 122 in place under substantial Poisson's transverse deflection resulting from centrifugal expansion of all of the rotating parts defining spool 34 and flywheel 12.

Flywheel energy storage systems according to the invention provide high specific power, in the neighborhood of from 5–8 kilowatts per kilogram of weight of system. The units provide a fast charge time of one to two minutes for surge powering units. Long service lifetime, in the neighborhood of from ten to twenty years is expected of systems embodying the inventions. In high specific energy versions of the flywheel energy storage systems, the systems will provide between about 80 and about 100 watt hours per kilogram at 100,000 power cycles. Round-trip efficiency of the system exceeds 90%.

Typical operating parameters and dimensions for flywheel energy systems embodying the invention are set forth in Table 1.

The preferred construction of the flywheel energy storage system flywheel ring is biannular with multi-materials being used. Desirably, the inner ring is a silicon dioxide glass/epoxy composite while the outer ring is a carbon/epoxy composite. The hub of the ring is preferably 7075-T651 aluminum. The flywheel is rated to operate at 30,000 RPM for 100,000 cycles of system operation. Ultimate flywheel speed is over 50,000 RPM prior to failure. The system can operate over a temperature range of from −40 degrees C. to +80 degrees C., handling a rated power of 40 kilowatts.

Typical outer diameter of the flywheel is about 15-½ inches, axial thickness is about 3-½inches, swept volume of the flywheel is about 660 cubic inches. Typical engineering data for various flywheel energy storage systems embodying the invention, in various sizes, are set forth in Table 1.

Figure 4:
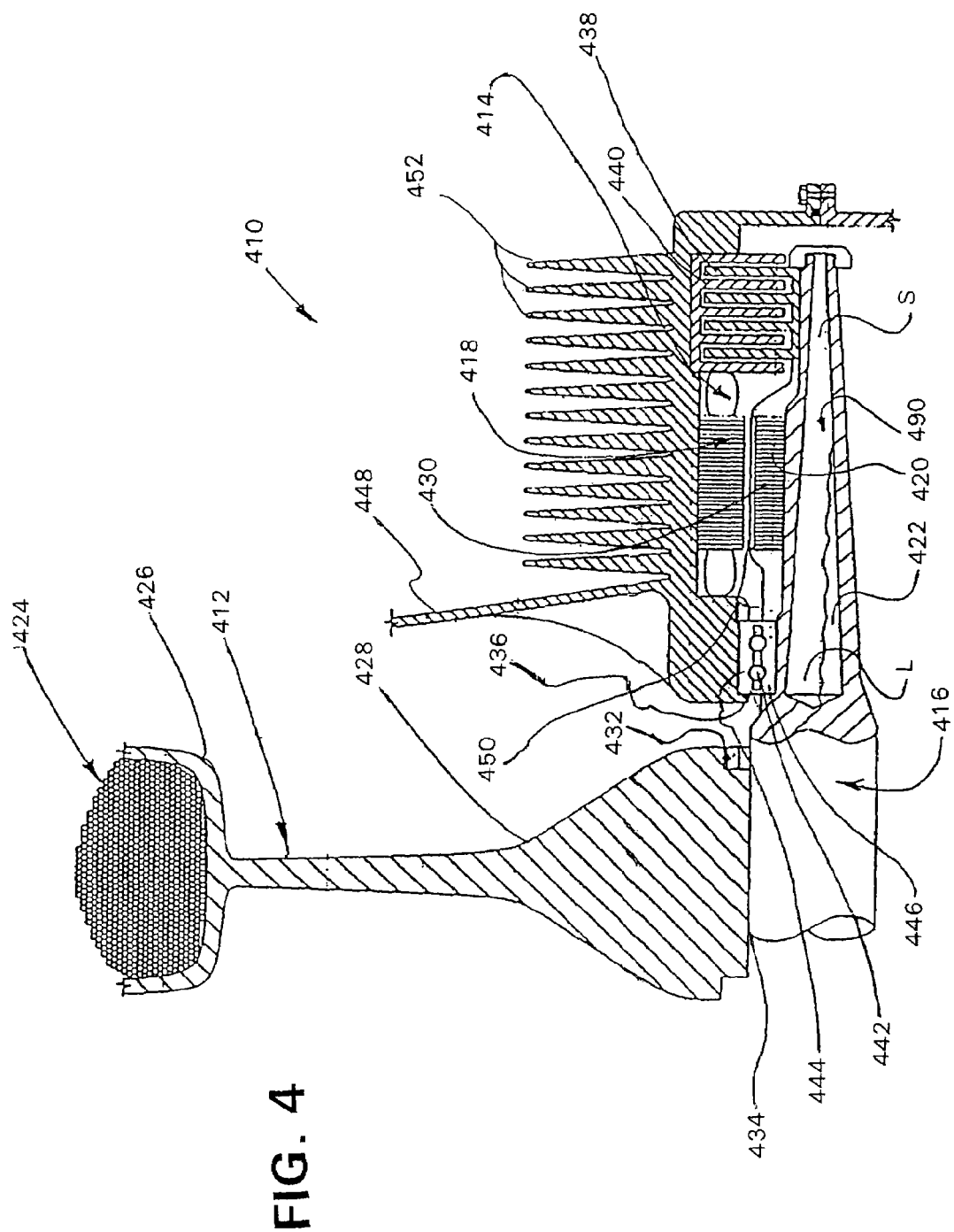
FIG. 4 is a broken sectional view of a third embodiment of a flywheel energy storage system manifesting aspects of this invention.

Another embodiment of a flywheel energy storage system embodying aspects of this invention is illustrated in FIG. 4 where the flywheel energy storage system is designated generally 410 and includes a flywheel designated generally 412, a motor/generator designated generally 414 and a shaft designated generally 416. In the flywheel energy storage system embodiment illustrated in FIG. 4, shaft 416 rotates. This is in contrast to the embodiments of the flywheel energy storage system illustrated in FIGS. 1 and 2, in which the shaft is stationary and the flywheel and portions of the motor/generator rotate about the stationary shaft.

In FIG. 4 motor/generator 414 includes a stator designated generally 418 and a rotor designated generally 420 where rotor 420 is fixedly connected to shaft 416 and concentrically disposed within and radially spaced from stator 418. Rotor 420 includes a plurality of axially elongated permanent magnets, one of which is illustrated in FIG. 4 and designated generally 450, which are circumferentially spaced around the exterior of rotor 420 and face towards stator 418.

Shaft 416 includes an axial bore 490 which tapers within shaft 416. As illustrated in FIG. 4, axial bore 490 has a relatively large diameter at the left hand side of FIG. 4 and tapers to a relatively smaller diameter at the right hand side of FIG. 4. The smaller diameter of bore 490 is proximate an end of shaft 416.

Within axial bore 490 is heat transfer fluid, preferably water, which is designated 422 in FIG. 4. Fluid 422 serves to transfer heat along the axial length of tapered bore 490 by vaporization in the larger diameter region of bore 490, to the left in FIG. 4, and condensation in the smaller diameter of region of bore 490, to the right in FIG. 4.

The flywheel energy storage system designated generally 410 in FIG. 4 further preferably includes a vacuum enclosure, analogous to vacuum enclosure 18 in FIG. 1, surrounding at least shaft 416, flywheel 412 and motor/generator means 414, to provide the required high vacuum environment to minimize heat generation and frictional losses as flywheel 412 rotates. The vacuum enclosure has not been illustrated in FIG. 4 to aid drawing clarity.

Flywheel energy storage system 410 further includes a bearing assembly designated generally 436 in FIG. 4, facilitating rotation of shaft 416, flywheel 412 and the rotor 420 of motor/generator 414 about an axis. As illustrated schematically in FIG. 4, bearing assembly 436 includes an inner ring 446, an outer ring 444 and a plurality of bearing balls 442.

As illustrated in FIG. 4, flywheel 412 may use a different type of construction than the flywheel illustrated in FIG. 1. Of course, the flywheel construction illustrated in FIG. 1 can be used with the apparatus in FIG. 4 and vice-versa.

Flywheel 412 includes a plurality of unbonded, continuous filament rings 424 which may be made of steel piano wire or other low cost filament materials. The unbonded filaments in rings 424 are solid-lubricant coated during the winding process to prevent surface damage on those filaments during their rubbing against each other from centrifugal stretching and contracting as the rotor operates over a range of rotating speeds required in high speed flywheel energy storage systems. Rings 424 are preferably retained in a cup-shaped annulus 426 formed on the outside of a hub rotor 428. Alternatively, several bands may be provided around filament rings 424 bonding filament rings 424 together in local regions. These bands may be used in place of cup-shaped annulus 426 illustrated in FIG. 4. This construction is particularly suitable for large flywheel energy storage systems made for stationary utility or industrial applications in which the flywheels run at relatively low speeds as compared to those attainable by the composite flywheel 12 illustrated generally in FIG. 1.

Figure 11:
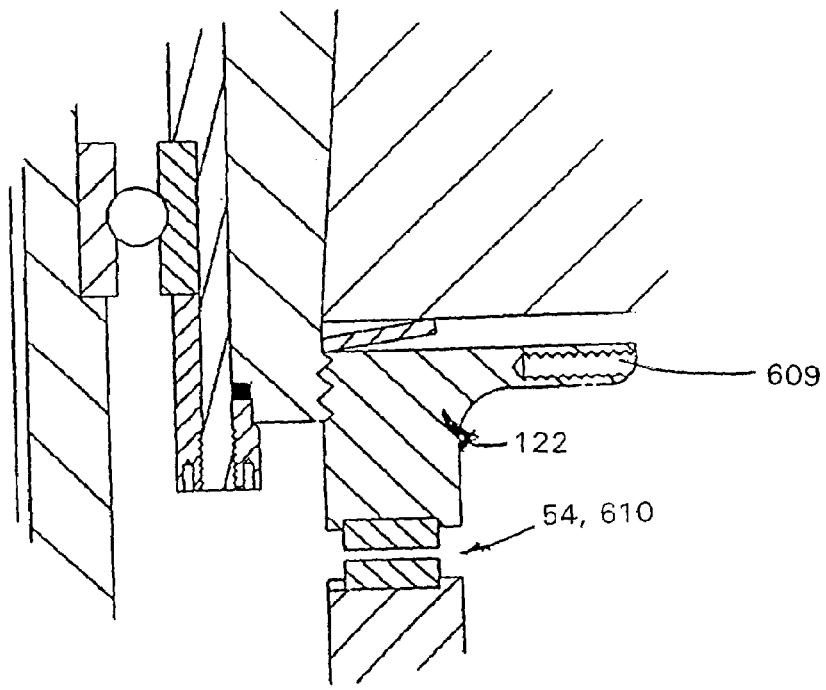
FIG. 11 is an enlarged view of some of the structure illustrated in the lower right hand corner of FIG. 9.

Still referring to FIG. 4, rotor 420 of motor/generator 414 includes permanent magnets 450 mounted on shaft 416 by means of a laminated back iron 430. Permanent magnets 450 may be retained in place by a composite, desirably graphite material overwrap. Laminated back iron 430 may be formed of a series of annular rings similar to those used as a part of the stator in the flywheel energy storage system illustrated in FIG. 1, which rings are illustrated in FIGS. 10 and 11, but without armature winding slots.

Flywheel hub 428 is preferably connected to rotating shaft 416 by means of a vulcanized elastomeric member 432. Such an elastomeric member provides connection between hub 428 and shaft 416 when hub 428 moves away from shaft 416 as angular acceleration increases. This system is similar to that described above with reference to FIGS. 1, 5, 6, 7, 8 and 9 and facilitates lift-off of hub rotor 428 from shaft 416 by centrifugal separation at surface 434 which is the interface between hub 428 and shaft 416. Such centrifugal separation reduces radial residual unbalanced loads which would otherwise be applied to bearing assemblies 436 as a result of rotation of flywheel 412 and rotor 420 of motor/generator 414.

Axial bore 490 is hermetically sealed within shaft 416 and together with heat transfer fluid 422 defines a self-contained rotating heatpipe providing thermal balance for the flywheel energy storage system illustrated in FIG. 4.

During flywheel rotation, heat transfer fluid 422 boils to vapor as a result of heat generated by bearing assemblies 436 and rotor 420 of motor/generator 414. This boiling occurs at the larger diameter end, denoted "L" in FIG. 4, of tapered bore 490. The resulting vapor phase of the heat transfer fluid flows to the small end of the tapered bore 490, which smaller end is designated S in the drawing. At the smaller end, the vapor phase of heat transfer fluid 422 condenses as a result of losing heat to the interior of shaft 416 at the smaller end of tapered bore 490. This end of tapered bore 490 within shaft 416 is maintained at a cooler temperature than the remainder of tapered bore 490 as a result of the provision of cooling fins 428 in close proximity extending radially from shaft 416 in the vicinity of region S of tapered bore 490.

Once the heat transfer fluid has condensed back into the liquid phase, the liquid flows as a result of centrifugal force along in the axial direction along the wall of tapered bore 490 from the region S of smaller diameter to region L of larger diameter, where the heat transfer cycle begins again. As a result of the heatpipe within shaft 416, effective thermal conductivity of shaft 416 is greatly enhanced.

Cooling fins 438 extending radially from shaft 416 preferably fit within a split clam-shell type set of stationary heat transfer fins 440. These fins preferably extend from the inside of the vacuum enclosure 448 and are preferably integral with vacuum enclosure 448 so that natural, self-contained cooling of the complete flywheel energy storage system may be achieved.

While only a single end of shaft 416 has been illustrated, it is to be understood that preferably two heatpipes are provided within shaft 416, to cool bearing assemblies 436 provided on either axial side of flywheel 412.

To provide the required convection cooling to ambient air needed to dump the heat generated within vacuum enclosure 448 as the flywheel energy storage system operates, the vacuum enclosure 448 is preferably constructed with a plurality of integral convection cooling fins 452 in close proximity to secondary cooling fins 440 so that heat received by secondary cooling fins 440 may conduct through the structure of vacuum enclosure 448 and be convected to ambient via convection cooling fins 452.

While not illustrated in FIG. 4, stator 418 may be of the same type and construction as illustrated in FIGS. 1, 10 and 11.

Figure 5:
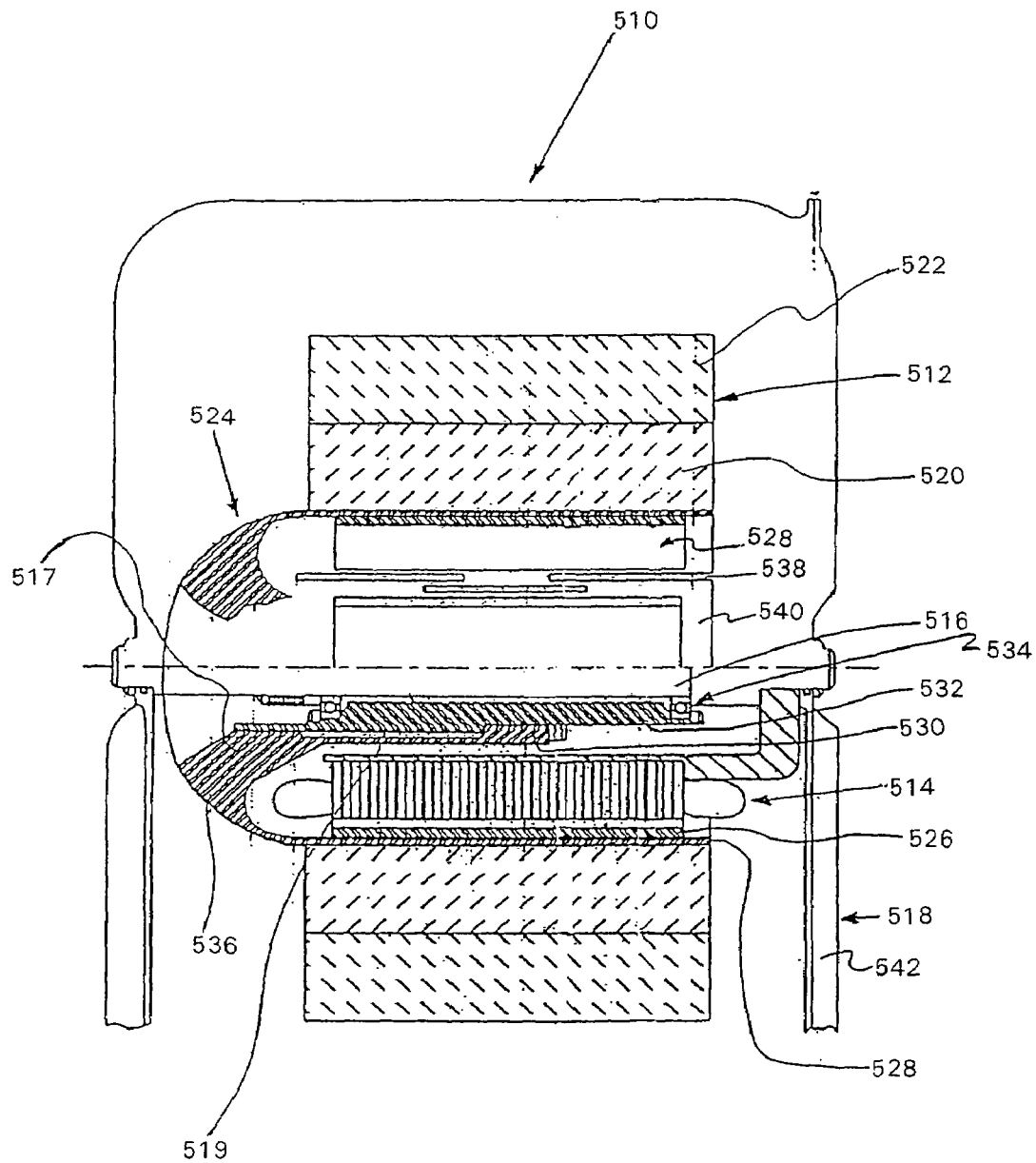
FIG. 5 is a broken sectional view of a fourth embodiment of a flywheel energy storage system manifesting aspects of this invention.

FIG. 5 illustrates yet another embodiment of a flywheel energy storage system manifesting aspects of this invention where the flywheel energy storage system is designated generally 510. The flywheel energy storage system includes a flywheel designated generally 512, a motor/generator designated generally 514, a stationary-shaft-designated generally 516 and a vacuum enclosure, designated generally 518, enclosing all of the aforementioned components of this system.

In the embodiment of the flywheel energy storage system illustrated in FIG. 5, flywheel 512 has an inner annular portion 520 and an outer annular portion 522 where these two portions are respectively analogous to the inner and outer annular ring portions 28, 30 of flywheel 12 illustrated in FIG. 1.

A shell member designated generally 524 in FIG. 5 functions as a hub supporting flywheel 512 and further carries permanent magnets 526 as shell member 524 rotates; hence, shell member also functions as the rotor portion of motor/generator 514. Shell member 524 has an axially extending external cylindrical portion 528 within which permanent magnets 526 are mounted.

Shell member 524 further includes an inner cylindrical portion designated 530 in FIG. 5 fitting in complemental engagement with an inner sleeve 532 which is rotatable about shaft 516 by virtue of bearing assemblies designated generally 534 in FIG. 5. Outer and inner cylindrical portions 528, 530 respectively of shell member 524 are connected by a substantially closed, curved end portion 536.

As flywheel 512 accelerates angularly, centrifugal force causes outer cylindrical portion 528, which is fixed to flywheel 512, to attempt to move radially outwardly with respect to inner cylindrical portion 530 and shaft 516 to radially separate therefrom. Separation occurs between inner sleeve 532 and a cup-shaped ring 517 as the cup-shaped ring moves away from inner sleeve 532 due to centrifugal force as angular acceleration increases. Inner cylindrical portion 530 includes a thin member which serves as the elastic connection between a heavier part of inner cylindrical portion 530, which heavier part is secured to inner sleeve 532 and is denoted 519 in FIG. 5, and the curved closed end portion 536. Hence, the thin cylindrical portion 519 of inner cylindrical portion 530, even though it is fabricated of metal, provides the continued connection between the separated rotating members, serving the same function as O-rings illustrated in FIGS. 1, 2, 6, 7, 8 and 9 and discussed above.

Outer cylindrical portion 528 supports permanent magnets 526. Providing such support, outer cylindrical portion may be referred to as a "back-iron" since outer cylindrical portion provides the function of the rotor of the motor/generator 514.

Desirably, outer cylindrical portion or back-iron 528 is iron alloy and is desirably split by slits 538 into segments 540 fitting behind and supporting each permanent magnet. Preferably shell member 524 has axially elongated slots between adjacent ones of each of permanent magnets 526 in outer cylindrical portion 528. Extremities of slots 538 may be axially inboard of axially extremities of permanent magnets 526. Some of slots 538 may be at common angular locations so as to be axially aligned.

As an alternative configuration, extremities of at least some of slots 538 are outboard of axial extremities of permanent magnets 526. Hence, outer cylindrical portion 528 may be separated into segments by continuous slots 538 or may be only partially separated into segments by slots 538 extending less than the entire axial length of outer cylindrical portion 528.

Desirably, outer cylindrical portion 528 of shell member 524 is assembled with a large interference fit inside the bore of the inner annular portion 520 of flywheel 512 so that, at assembly, gaps defined by slots 538 are closed. As flywheel 512 accelerates and its speed increases, slots 538 open at a selected design speed to define gaps as illustrated in FIG. 5. Transition from the tightly compressed condition of outer cylindrical portion 528 with contact between areas which are illustrated as defining boundaries of slots 538 in FIG. 5, to the configuration illustrated in FIG. 5 at rotational speed is important—magnetic flux of permanent magnets 526 traverses easily through the edges defining slots 528 when those edges are in contact, but traverses much less easily when slots 538 have opened. This produces a significant beneficial field-weakening effect in the stator portion of motor/generator 514. This effect occurs even when a reluctance-designed motor is substituted for the design illustrated in FIG. 5. Such substitution reduces centrifugal force on the flywheel ring by elimination of the rotating magnets.

Thermal balance of the flywheel energy storage system illustrated in FIG. 5 is enhanced by presence of cooling fins 542 provided as an integral portion of vacuum enclosure 518 which in turn is in thermal connection with both shaft 516 and the stator portion of motor/generator 514. Most desirably all electrical connections are made through the ends of stationary shaft 516, which desirably extend from vacuum enclosure 518 as illustrated in FIG. 5, so no vacuum feedthroughs are required.

Figure 3:
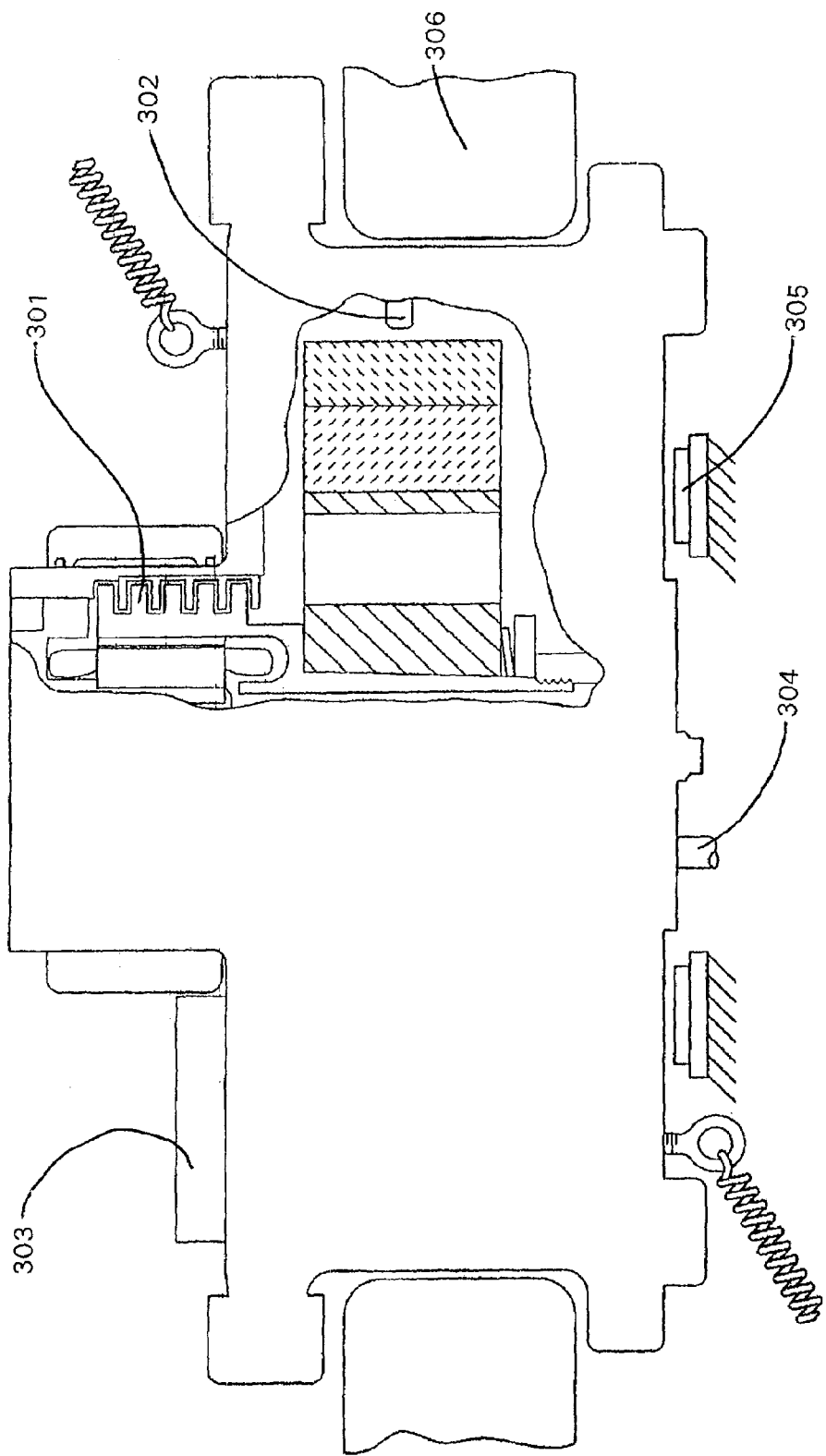
FIG. 3 is a broken view a second embodiment of a flywheel energy storage system manifesting aspects of this invention.
Figure 21:
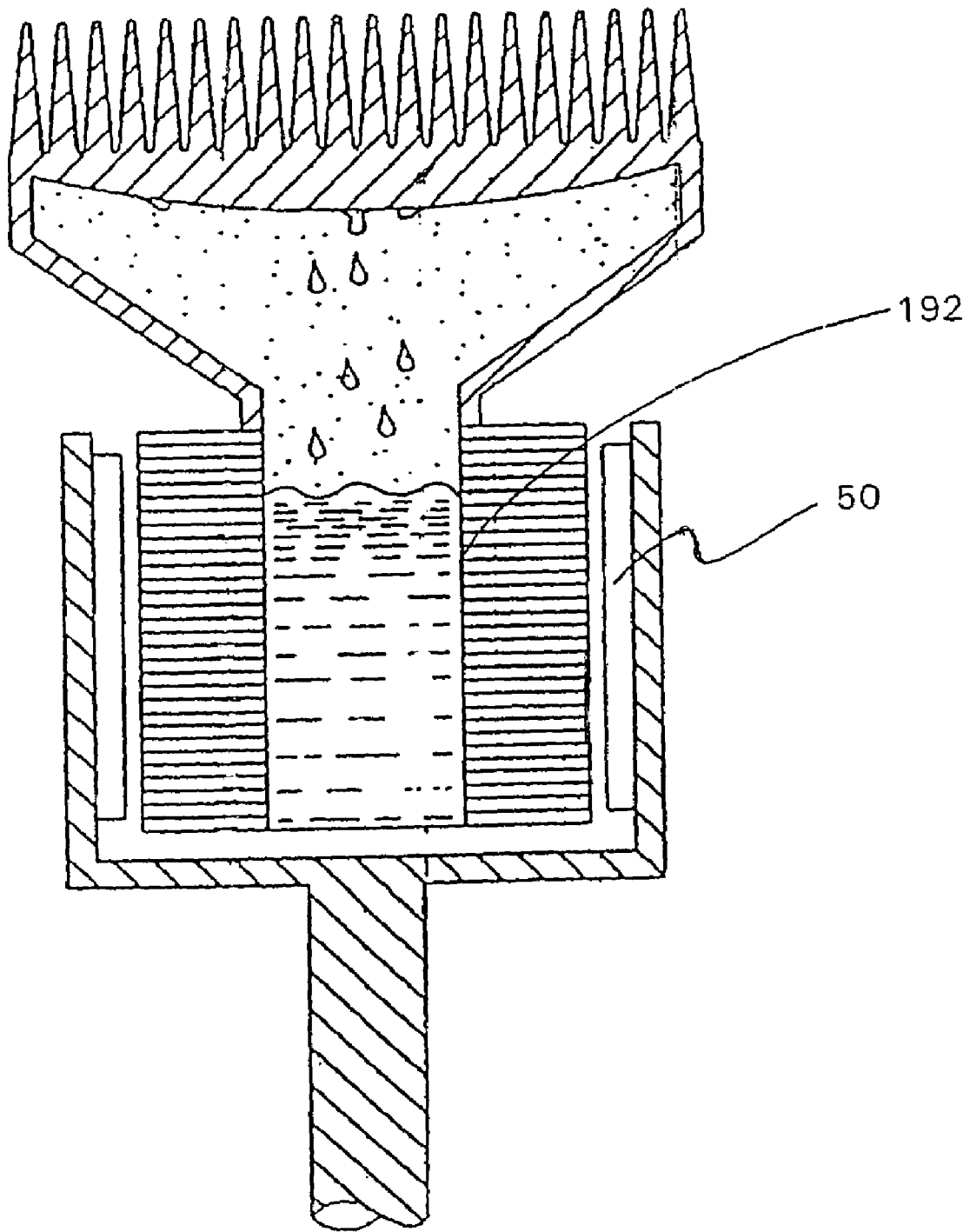
FIG. 21 is a schematic side elevation, partially in section, of a heatpipe cooling system for both the flywheel motor stator and flywheel energy storage systems bearings which does not require a circulating fluid pump, suitable for use with the flywheel energy storage system illustrated in FIGS. 1 and 3.

FIG. 21 shows a stationary heat-pipe cooling system for stationary vertical-shaft flywheel energy storage systems like those in FIGS. 1 and 3, in which the boiler or evaporator 192 inside the motor stator, which in turn fits inside the motor rotor with its permanent magnets 50, removes heat from the stator and the bearings. The vapor from evaporator 192 rises up to a condenser 194 cooled by convection fins, where the condensed liquid falls by gravity back into the boiler, and the cycle starts all over again.

Referring to FIGS. 10 and 25, the detailed construction is given for compact, high efficiency, motor/generator armature stators, for flywheel energy storage systems running over a wide range of high speeds. A plurality of very thin lamination rings 74, made of metal alloy with a tooth shape at the periphery for minimum cogging and maximum efficiency, are stacked and partially define the stator, around which permanent magnets 50 rotate on the rotor around the stator. The armature windings 76 in FIG. 25 completely fill all of the openings defined by the tooth spoke, and are wound to provide maximum efficiency and power density for the complete system.

Again referring to FIG. 1, a flywheel energy storage-system manifesting aspects of the invention is shown, with the system including a prestressed, wound-fiber-reinforced, biannular composite ring 26 mounted on a flexible-rim hub 20, which in turn is thermally mounted on a spool rotor assembly shown in greater detail in FIGS. 2, 6, 7, 8 and 9. This spool rotor assembly comprises inside-out, radial-gap, brushless-DC motor/generator 14, in which the rotating permanent magnets 50 are mounted inside the rotating spool rotor 34, and the stationary armature on stator is mounted on the top end of the stationary shaft 16. In this way, water cooling for the armature is provided by finned internal passages defining internal annular cooling water reservoir 68 from supply connections outside of vacuum enclosure 18.

In a similar manner, water cooling of the hybrid-ceramic, angular-contact ball bearing assemblies with special-design cages and solid-lube-assisted, low-volatility-grease lubrication 36 may be provided via fittings outside the vacuum enclosure 18 at the bottom of the assembly, in which water is supplied through a bore 132 inside the shaft 16, so that this bearing cooling water circulates evenly near both the upper and lower bearings 36 in the assembly.

A permanent magnet system 54 is preferably built into the assembly, so that repulsion between a rotating ring magnet 56 and a stationary magnet 58, which may be equipped with an intervening back-iron washer (which is not shown in the drawings) to minimize power losses in these magnets, carries the rotor dead weight so that bearing assemblies 36 are subjected only to their preload. The bearing preload is provided by a plurality of coil springs 84 in a cartridge 82, which slides with a small clearance on the shaft 16, in which a suitable, vacuum-compatible lubricant is provided and which cartridge 82 is keyed (which keying is not shown) to the shaft 16. This prevents destructive wear and galling of this cartridge/shaft surface at the high rotor speeds and unavoidable residual vibrations in-the flywheel energy storage system.

Mounted within the vacuum enclosure 18 in FIG. 1 is the flywheel ring crash guard 94 preferably made of steel or light-weight extra-high-strength fiber-reinforced composite as a containment in the event of ring failure. Also mounted on the vacuum enclosure 18, made for example of aluminum with possibly a composite overwrap, are the top vertical support member 62 defining the motor armature at the top of the vacuum enclosure 18 and the bottom vertical support member 60 defining a stationary hub at the bottom, both of which support the ends of stationary shaft 16.

The bearing preload springs 84 in their cartridge 82 are held by a lock-nut or cap 82 on the stationary shaft 16 so that this cartridge is pressed against the upper bearing inner ring 134. A shoulder on shaft 16 is dimensioned so that the lock-nut or cap 82 seats on this shoulder, leaving a close clearance 136 between the lock-nut and the shoulder. This clearance acts as a stop for cartridge 82 in the event inner ring 134 is pushed upward by an inadvertent high unbalance radial load on the bearings, and thus prevents excessive potentially damaging axial separation of the two bearing inner rings.

A material getter 25 is inside the vacuum enclosure to absorb any residual gasses there after pumping down the vacuum required to reduce windage and flywheel ring heating to manageable levels, so that the vacuum pump can then be removed and the high vacuum maintained over the design life of the flywheel energy storage system.

The entire enclosure 18 with bottom vertical support member 60 defining the stationary hub, crash guard 94 and the motor/generator portion stator may be supported either in gimbals or in soft elastomeric rings, which are not shown, to deflect to minimize gyroscopic maneuvering loads on the bearings when the flywheel energy storage system is used in vehicular applications. For stationary utility or uninterrupted power applications, standard commercial motor mounts can be used for support of this assembly, with fail-safe features to absorb all the kinetic energy in the flywheel in a benign manner in the event of any component failure in service, as described below.

Figure 22:
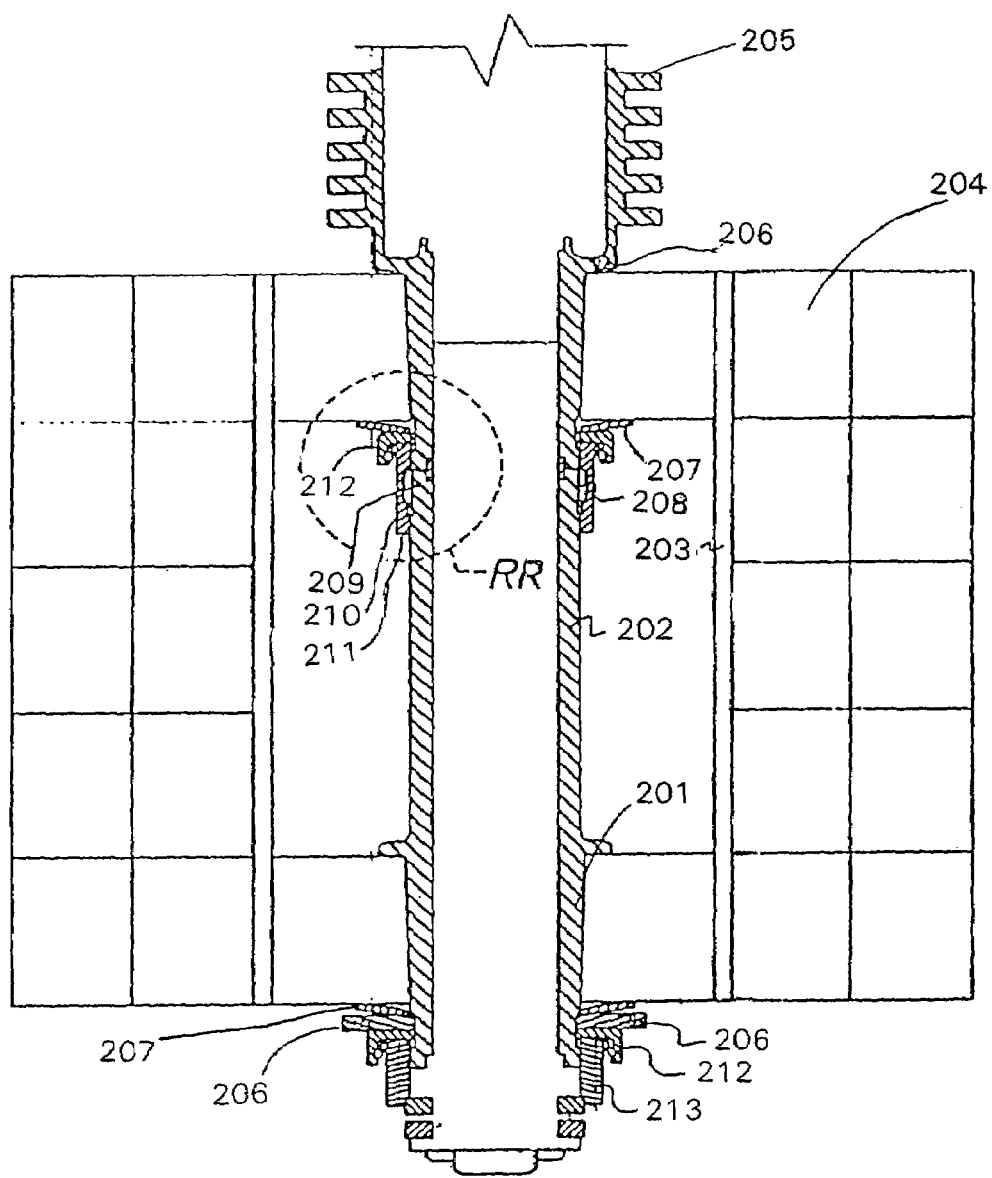
FIG. 22 is a cross-section schematically illustrating a flywheel energy storage system similar to that illustrated in FIG. 1 but utilizing a stack of rings mounted on a common tube supported at each end within a hub similar to that illustrated in FIG. 1 to obtain greater energy storage capacity.
Figure 23:
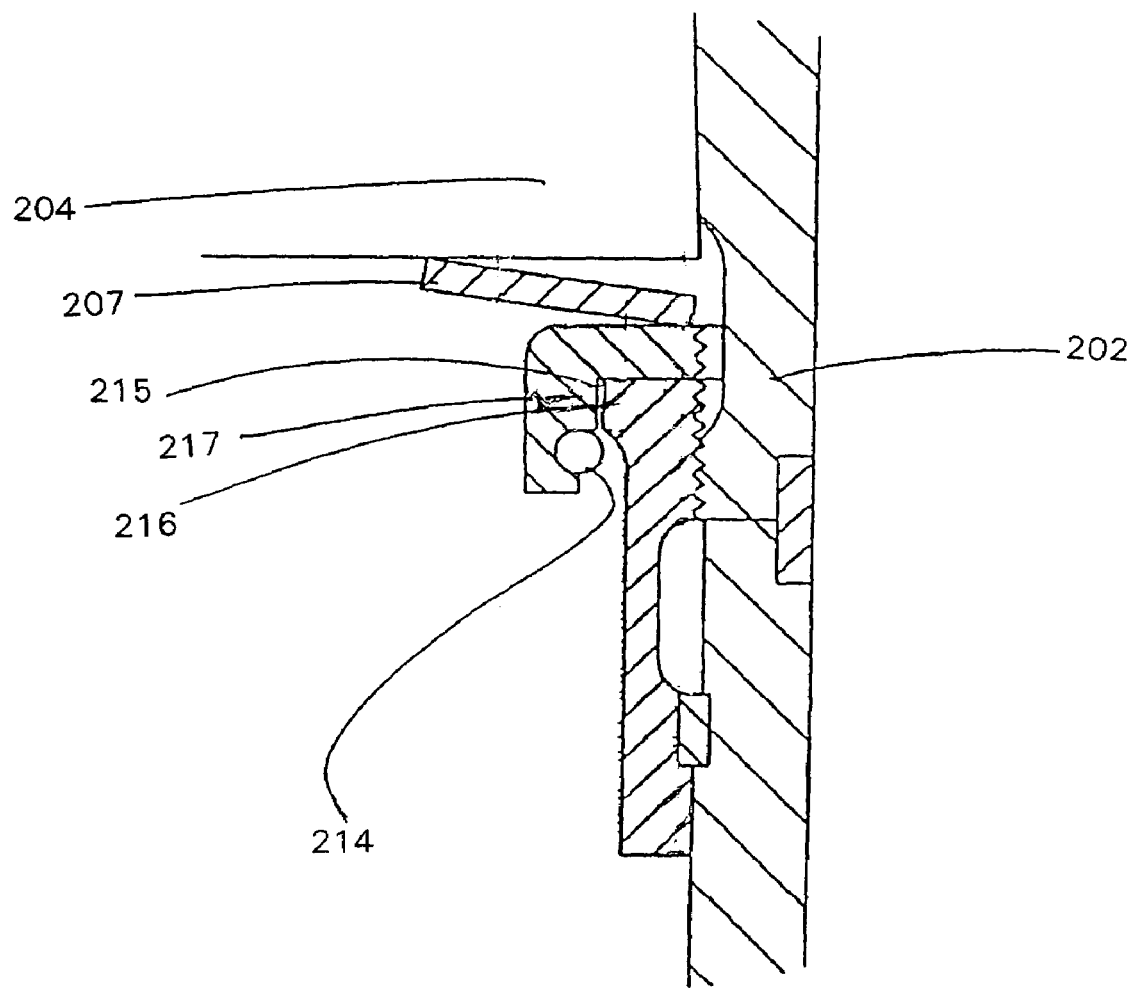
FIG. 23 is an enlarged view of structure at the bottom left of FIG. 22.

Referring to FIG. 22, the rotor support system 201, which is essentially the same as the design in FIG. 1, is used on both the top and bottom and is stretched axially by means of a connecting rotor element 202 support to each end of a continuous tube 203, on which is stacked a plurality (five are shown in FIG. 2) of biannular composite flywheel rings 204, similar to those illustrated in FIG. 1. In this way, the basic stability of the apparatus illustrated in FIG. 1 is used to build a flywheel energy storage system having increased energy storage capacity. The motor/generator in FIG. 22 is only partially shown, to illustrate parts which differ from those of the motor/generator of FIG. 1. The motor/generator rotor 205 illustrated in FIG. 22 is made with a finned configuration in this embodiment of the invention, to provide radiation cooling of this rotor in the vacuum environment. Matching clam-shell shaped internally finned elements (which are not shown in FIG. 2, but are shown in FIG. 3 and are described below) are fitted inside the vacuum enclosure to catch the radiated heat from the finned portion of rotor 205.

Two circumferential rows of balance screws 206 are provided, as shown in FIG. 22, above the upper flywheel hub and below the lower hub respectively, to facilitate dynamic balancing of the assembled rotor. Belleville washers 207 on the small tapered end of both flywheel hubs hold these hubs in place under the substantial Poisson's transverse deflections from centrifugal expansion of these hubs. A guide sleeve 208 holds the top half in precise alignment with the bottom half of the rotor, between which halves at their mating faces 209 a specific clearance is provided by shimming during thermal assembly, compensating for the Poisson's axial deformation of the flywheel rings 204 on the tube 203 over the design operating speed range of the flywheel energy storage system. These two rotor halves are held together by a spanner nut 210 against a split ring 211 that fits into a groove in the rotor, and is locked in place by a snap-ring and keyed washer assembly 212 that prevents loosening during operation but is easy to disassemble for maintenance. A similar keyed assembly 212 locks the spanner nut 213 in place, holding the lower hub on the rotor.

Referring to FIG. 3, the finned motor/generator rotor cooling system 301, as described above with respect to FIG. 22, is used to manage heat flow under operating conditions and may be a self-contained heat pipe for cooling of even larger production units, as described below. Infrared sensors 302 detect the temperature of flywheel ring, as well as the temperature of the moving motor rotor which is not shown in FIG. 3. Also, a transparent window 303 is used to observe this ring during operation inside the vacuum enclosure. A vacuum gage switch in the vacuum line 304 from this enclosure, as well as the infrared sensors, other thermocouples and accelerometers placed in strategic locations throughout the assembly, triggers a special computer circuit in the motor/generator controller to switch automatically from the motor to the power regeneration mode of the flywheel energy storage system in the event of any sign of component failure, so that the kinetic energy in the flywheel is dumped rapidly into a utility grid or into a bank of resistive heaters. In this way, the system can come to a stop in a completely benign manner with minimal damage to any of the components.

In the extreme case that the fail-safe mechanism does not perform as intended for any reason, the test flywheel energy storage system unit in FIG. 3 is fitted with truck-size disk brakes 305 and bulky elastomeric bumpers 306 placed around the robust steel enclosure to contain any kinetic energy transferred from the flywheel to the enclosure in the process of breaking.

Figures 14, 15:
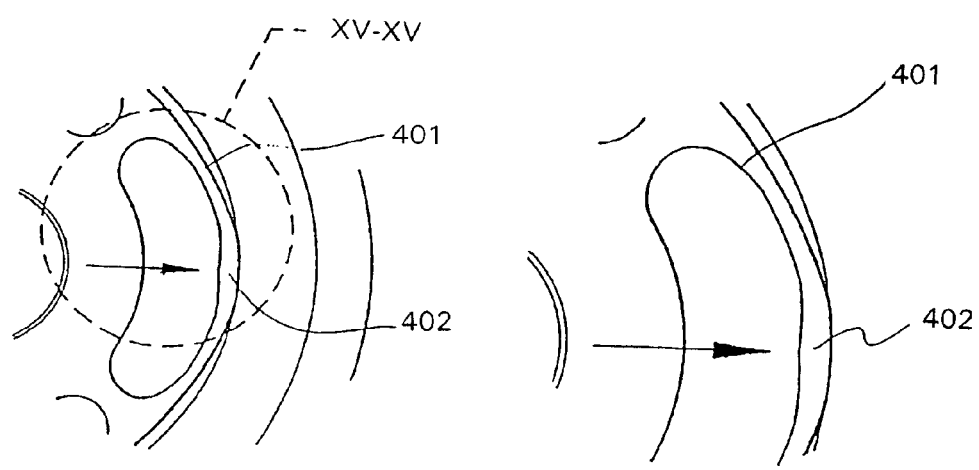
FIG. 14 is a view of the structure of FIG. 13 taken at circle XIV—XIV in FIG. 13.
FIG. 15 is an enlarged view of the structure illustrated in FIG. 14 taken at circle XV—XV in FIG. 14.
Figure 16:
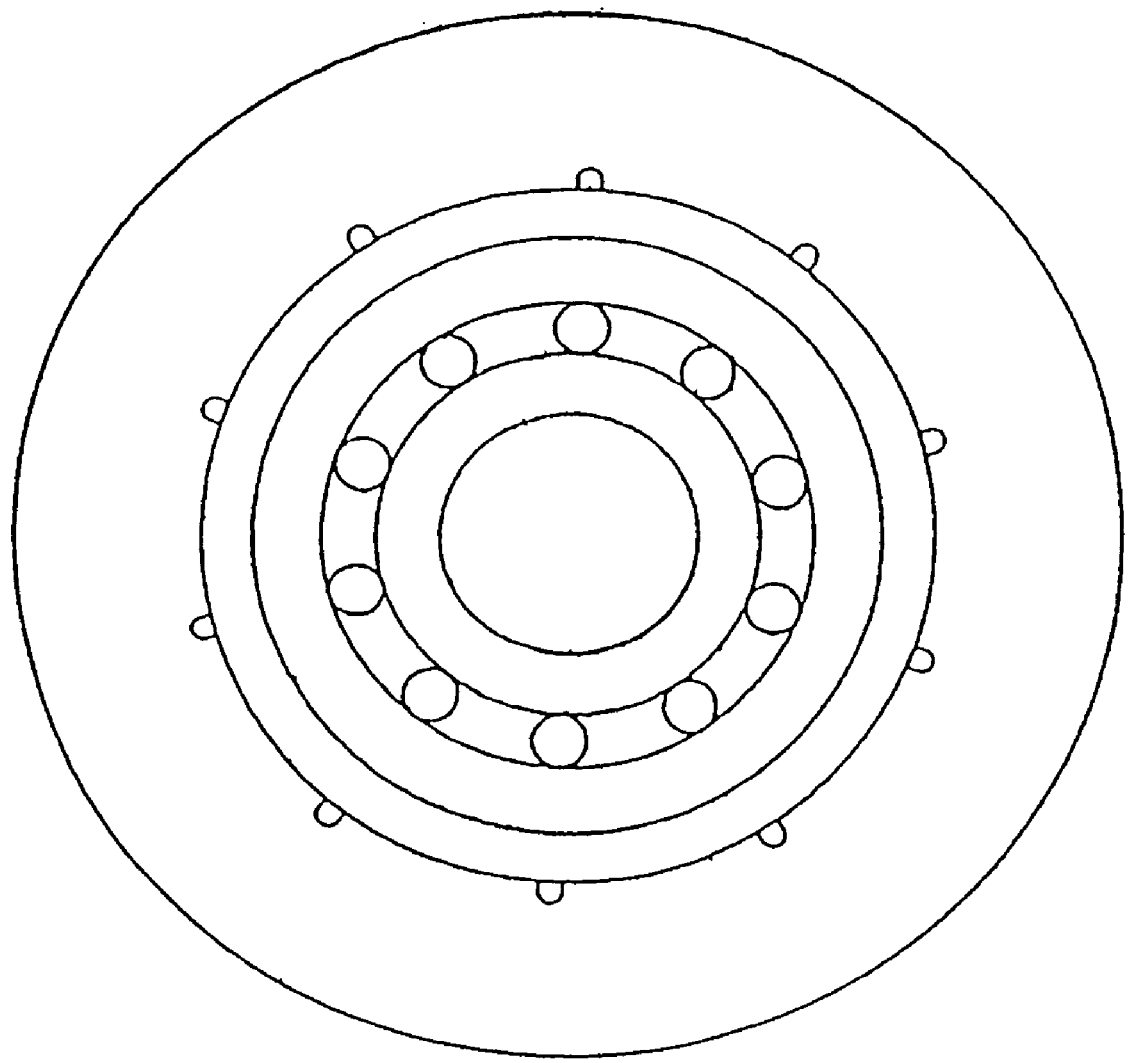
FIG. 16 is an end view of the embodiment of the flywheel energy storage system illustrated in FIG. 5 looking from the left hand side of FIG. 5 and with the vacuum enclosure removed.

Referring to FIG. 15, the end view of the flywheel hub in FIGS. 1, 2 and 3 shows the improved shape of the intersection 401 between the spokes and rim of this hub to reduce substantially stresses from centrifugal distortion over the design speed range of the flywheel energy storage system. Also, the thickening 402 of the section of the rim between the spokes decreases centrifugally generated stress and spreads the pressure from the outside of this rim more evenly over the inside the composite flywheel ring onto which it is thermally mounted with a large interference fit.

Figure 8:
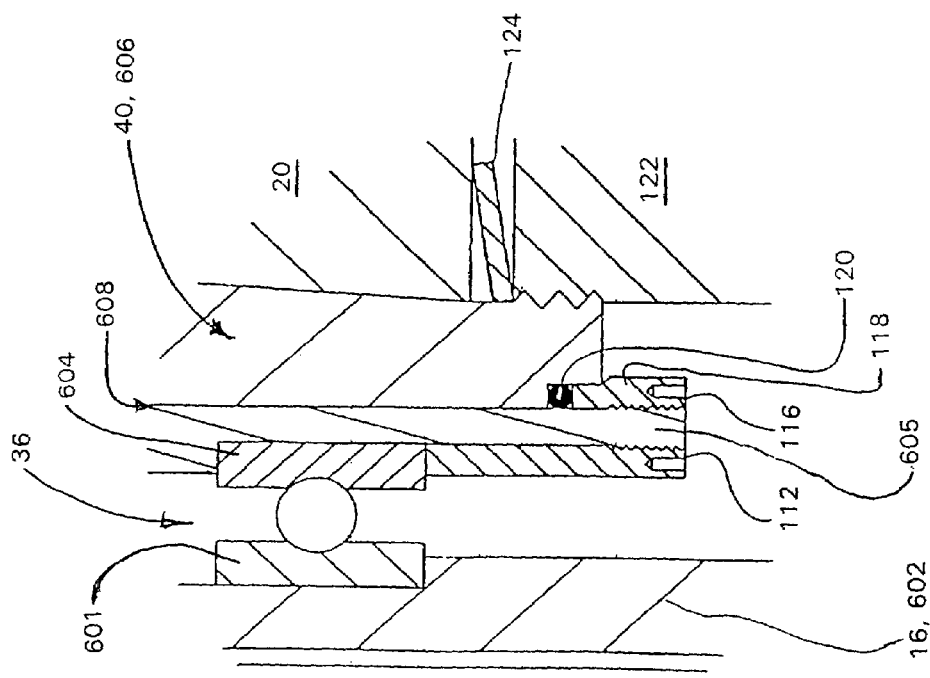
FIG. 8 is an enlarged view of the structure illustrated in FIG. 6 taken at circle VII—VII.

FIG. 8 illustrates another manifestation of the invention in which the stationary bearing inner rings 601 are fitted with a loose fit on the stationary shaft 602 to facilitate assembly and axial preloading from a spring cartridge 603. The bearing outer rings 604 are pressed with a tight interference fit inside the rotating sleeve 605. This sleeve 605 fits with a slight interference fit when stationary inside the rotor 606, with elastomeric O-rings between the sleeve 605 and rotor 606.

As the rotating speed of the rotor increases, the centrifugal expansion of all the rotating parts causes the fit between the sleeve 605 and the rotor 606 to open up into a gap 608 which forms at a speed just below the critical shaft speed with this gap 608 closed. Once gap 608 opens, critical speed of the rotor decreases to below rotor operating speed, resulting from the increased compliance of the bearing mount from elasticity of the O-rings.

Another important advantage of the use of O-rings is that these O-rings are mounted in the rotor assembly in this invention. The O-rings in this invention are not subjected to imbalance cyclic stress since they rotate in phase with the imbalance. The use of low-cost O-rings for the elastic element provide long life.

Figure 12:
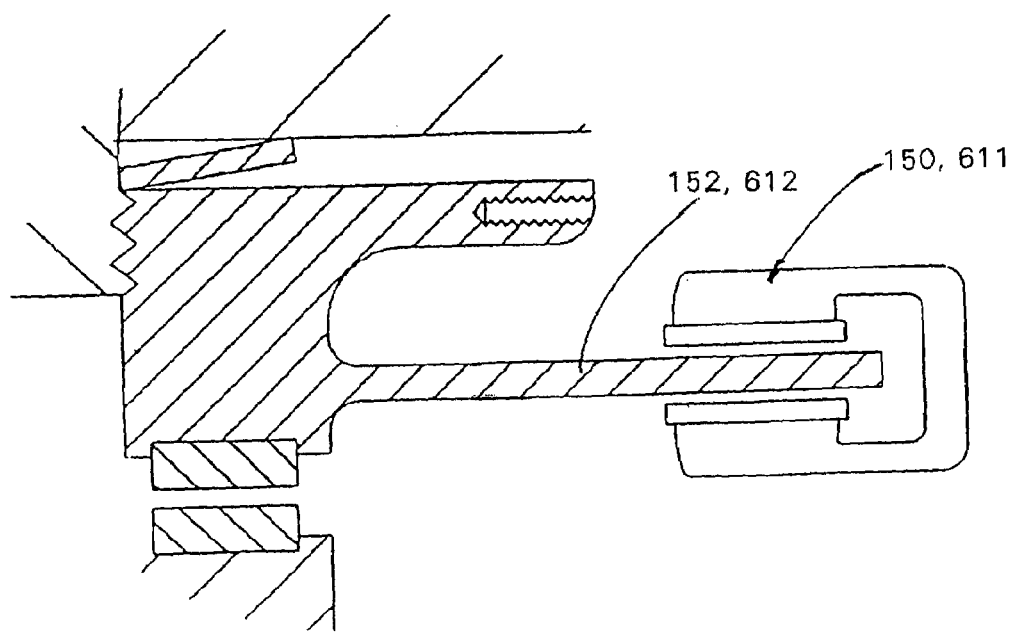
FIG. 12 is an enlarged view of a modification of the structure illustrated in FIG. 11.
Figure 13:
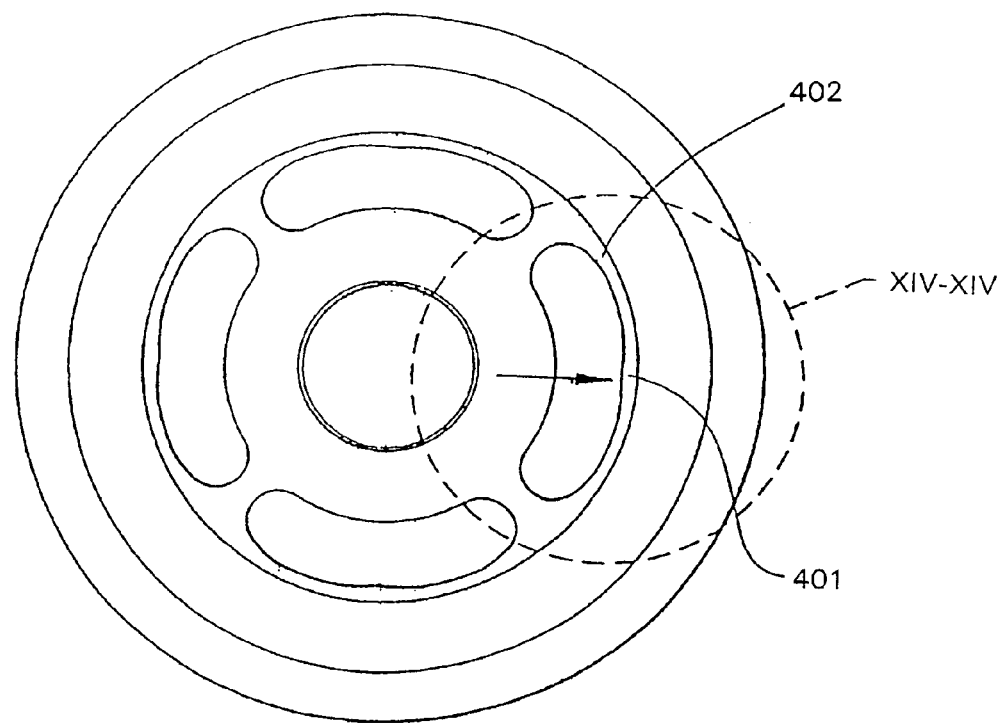
FIG. 13 is a top view of the flywheel hub, illustrated in FIG. 1, with the flywheel rings attached.

FIGS. 6, 7, 8 and 9 are further magnified views and sections of FIG. 1 illustrating the manner in which the vibration-decoupling device operates to achieve extremely low vibration amplitudes and bearing loads over the entire wide operating speed range of the flywheel energy storage system (and any other high-speed supercritical rotor in a wide variety of machinery). FIG. 11 is another detailed view of the section of FIG. 1 shown in FIG. 12, in which the lower balance ring 609 is illustrated, as well as the permanent magnet rotor dead weight thrust compensator 610 described above and shown in FIGS. 1 and 2. FIG. 15 is a further embodiment of FIG. 11 with a stationary disk brake caliper system 611 designed to bear on a brake disk 612 made as an integral part of the rotor in this flywheel energy storage system.

Figure 6:
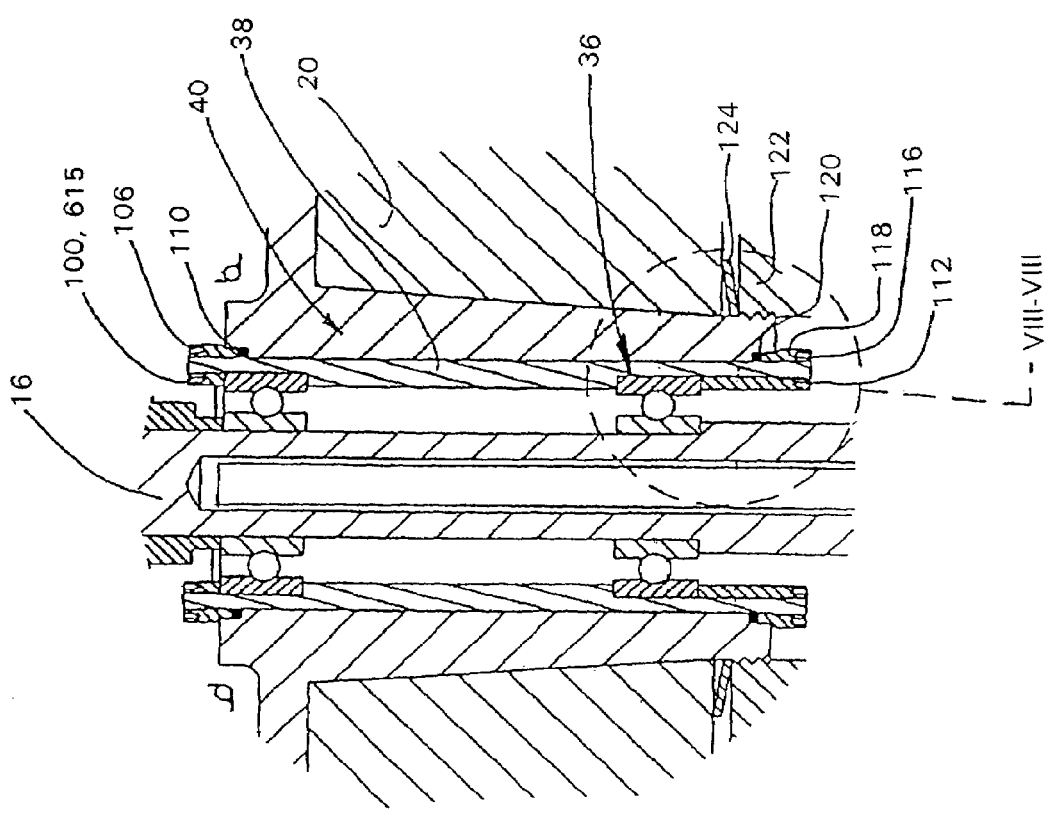
FIG. 6 is a sectional view of the apparatus illustrated in FIG. 1 taken at circle VI—VI in FIG. 1.
Figure 19:
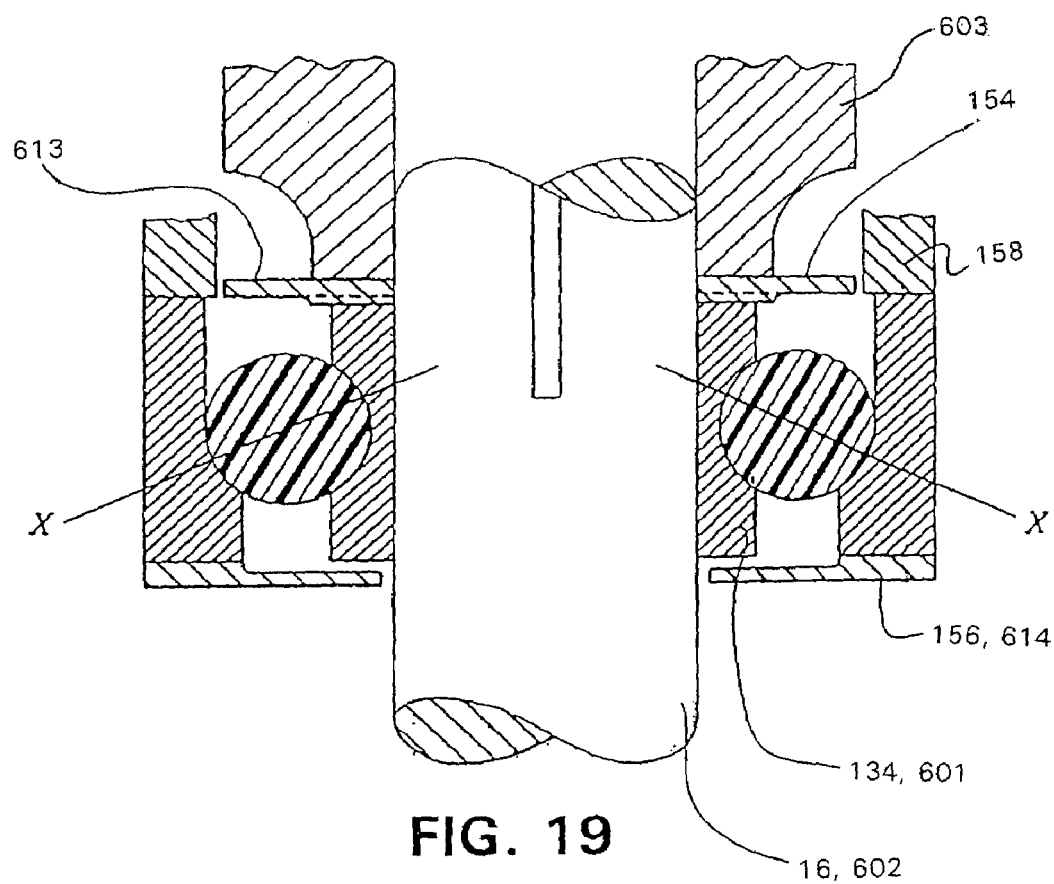
FIG. 19 is an enlarged view of the upper bearing assembly illustrated in FIGS. 1 and 2, showing lubricant shields around the bearing and a lower portion of the bearing pre-load spring cartridge, with the cartridge and the upper shield keyed to the stationary shaft.
Figure 20:
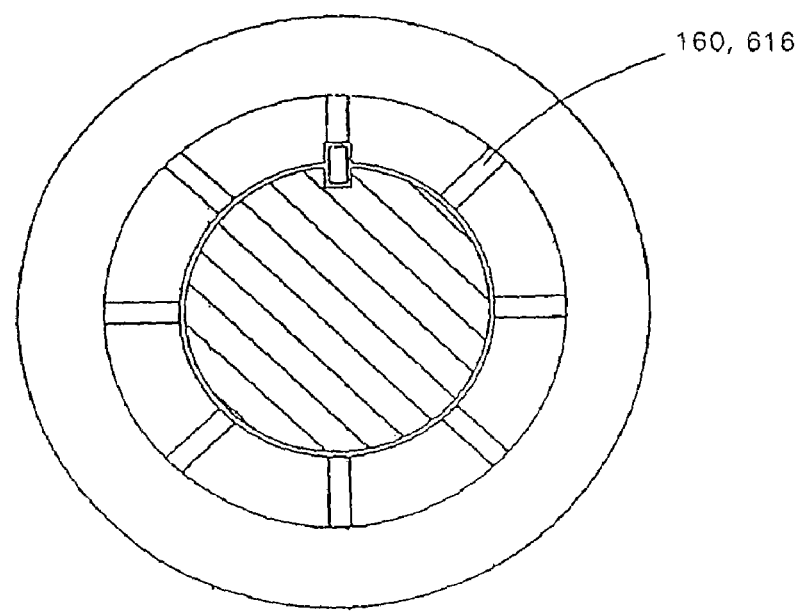
FIG. 20 is a plan view of the lower side of the upper shield illustrated in FIG. 19, showing a sliding-pad thrust bearing construction preventing damaging wear of the contacting surfaces under bearing thrust pre-load.

FIG. 19 is a detailed enlargement of the upper bearing in FIGS. 1, 2 and 6 showing the stationary upper lubricant shield 613 and rotating lower lubricant shield 614, the latter of which is clamped axially in the assembly by the locknut 615. The upper shield 613 along with the bearing inner ring 601 is fitted loosely on the shaft 602 and thus is free to move on the shaft by application of the preload from the spring cartridge 603. FIG. 20 is a plan view from the bottom of the upper shield 613 in FIG. 19, and it shows the plurality of shallow radial grooves 616 machined in the lower face of this shield which contacts the upper face of the upper bearing inner ring.

Referring to FIG. 18, the geometric configuration is shown for the typical vibration-decoupling system used to mount any of the above self-lubricating bearing designs on high-speed rotors for vibration-free operation at rotor speeds above their critical speeds. This system includes a sleeve 501 mounted on the rotating shaft 502 between the shaft and the rotating bearing ring. Each end of sleeve 501 consists of a thin-section continuous ring pressed with a tight interference fit 503 on to the shaft 502. The bearing rotating ring is pressed with a tight interference fit on to the outside diameter of the thicker-section central ring of 501, which fits with a smaller interference fit 504 on the shaft when the shaft is stationary and with a gap 504 between the inside diameter of this central ring and the shaft 502 when the shaft rotates above a certain speed.

The fit 504 exists when the shaft is stationary; when the shaft rotates gap 504 opens at a predetermined shaft rotational speed below the first critical speed of the rotor as a result of the centrifugal expansion of the rotating bearing ring assembly on the central portion of the ring 501. This central ring is connected to the two thin-section rings on the ends by integral squirrel-cage-like bars 505 machined into the basic ring configuration 501. The cross-section of these bars 505 provide the right amount of elastic compliance between the bearing and the rotor 502 to reduce the critical frequency of the rotor, after the gap forms when the sleeve lifts off of the shaft, to enough below the lift-off speed to avoid the shaft from running at its critical speed, thus avoiding any high unbalance loads on the bearing.

Figure 24:
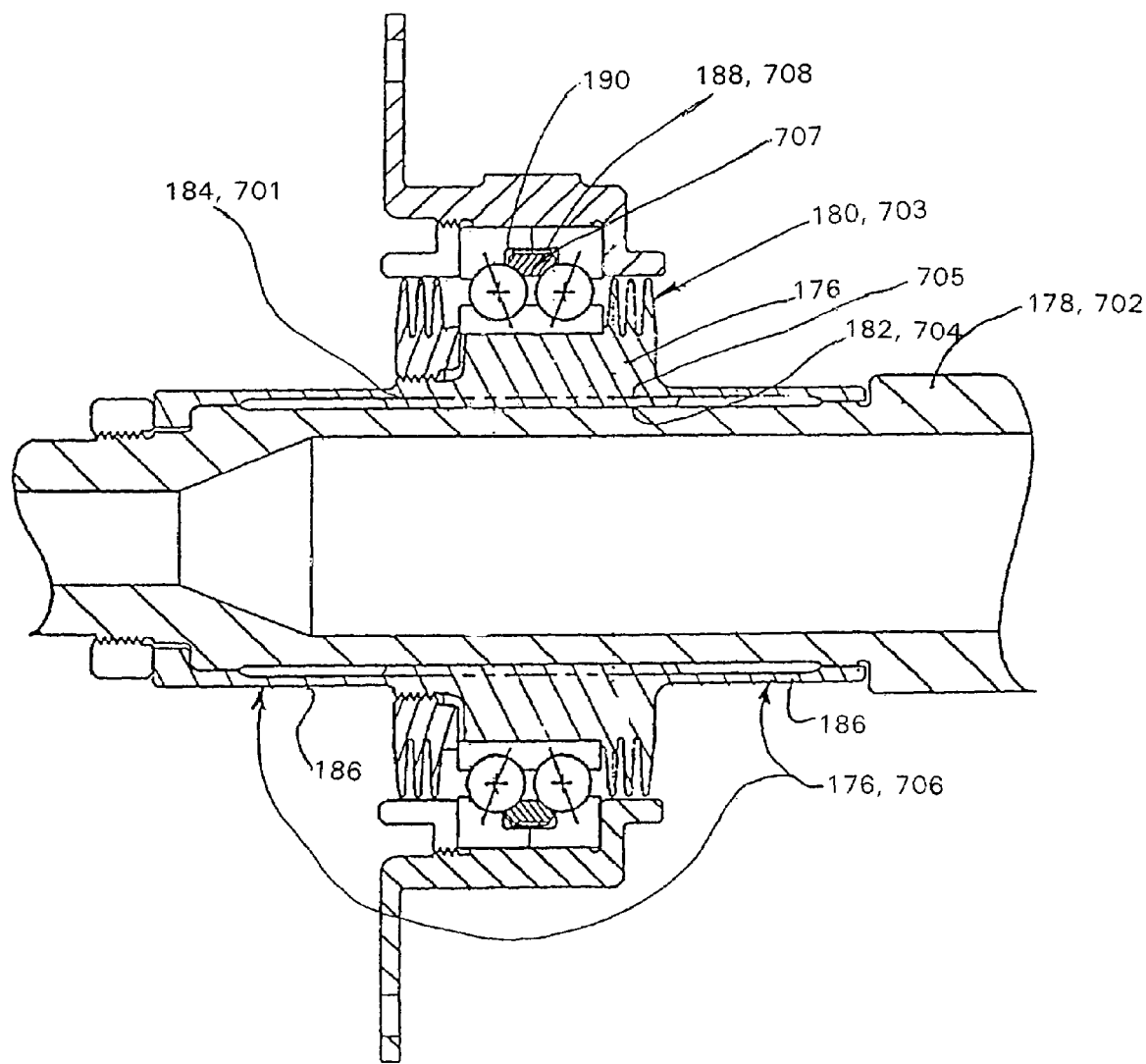
FIG. 24 is a cross-section of a high speed bearing assembly showing yet another aspect of this invention utilizing the rotating shaft mounting sleeve illustrated in FIGS. 17 and 18 and illustrating another manifestation of the vibration-decoupling aspect of the invention.

FIG. 24 is yet another manifestation of the invention in which the vibration-isolation ring 701 is mounted on the rotating shaft 702 in a manner similar to the way the ring 501 is mounted on the shaft 502 in FIG. 18. In FIG. 24 this ring 701 has additional features such as the cooling fins 703 made integral with it for providing thermal balancing of this high-speed assembly as well as the centrifugal mass required to lift off and create the gap 704 as described above.

Another important feature of the design in FIG. 24 are the axial scallops 705 in the inside diameter of the central ring of 701, which increase the centrifugal expansion of this ring 701 for creating the gap 704 at a lower rotational speed than without these scallops for the same rotating mass of the rotating bearing inner ring mounted on the ring 701. The thin-section tubular portions 706 connecting the central ring with the thin rings on the ends of the ring 701 can be made long enough to provide the required radial compliance, or they can be made in the squirrel-cage configuration shown as 505 in FIG. 18. Also, the continuous solid-lubricant replenishing ring 707 in this high-speed bearing is fitted with a shrink band 708 to contain the centrifugal stresses in the low-strength lubricant material.

Referring to FIG. 26 there is illustrated another embodiment of the coupling apparatus facilitating passage of an acceleratingly rotating body through a critical frequency of rotation in which a rotor 600 is retained in place with respect to a shaft 602 by a rotor lockdown nut 604 retaining in place a first lift element 606. Lift element 606 is retained in place by a lockdown nut 608 which bears against a Belleville washer 610.

A body cavity 612 may optionally be designed as a sealed cavity and filled with a viscous damping fluid to provide squeeze film damping under high speed operation. Alternatively, body cavity 612 may be fit with O-rings or other elastic elements to provide high speed damping.

An optional sheer pin torque coupling is provided and designated generally 614. Indicator arrows 616 in FIG. 26 and in FIG. 27 illustrate lift off of the rotating member with respect to the shaft as the rotating member angularly accelerates.

FIG. 28 is an end view, partially broken away, of a rotatable member illustrating a high torque spline attachment of rotating bodies using the coupling apparatus and method of the invention. Similarly, FIG. 29 illustrates a high torque non-circular lobe arrangement using the coupling apparatus and method of the invention.

Figure 31:
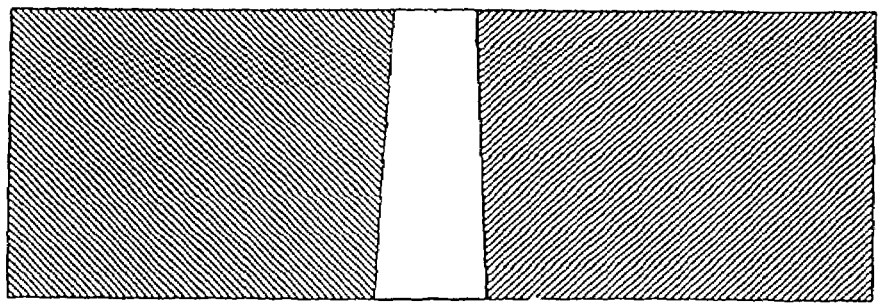
FIG. 31 is a sectional view taken through the flexible rim hub illustrated in FIG. 30.
Figure 30:
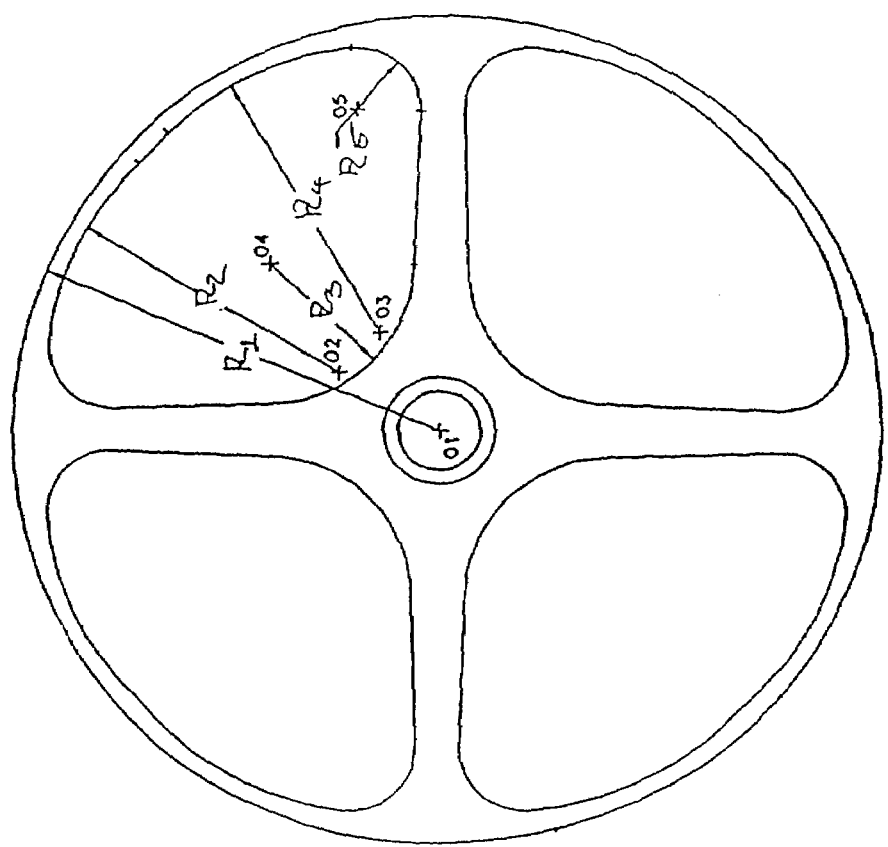
FIG. 30 is a front view of an alternative embodiment of a flexible rim hub for use with flywheels in the flywheel energy storage systems of the invention.
Figure 33:
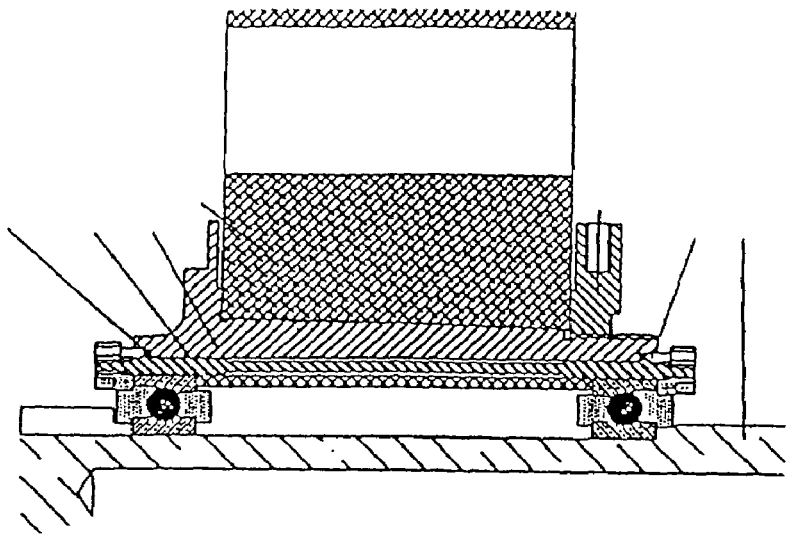
FIG. 33 is an enlarged view of the structure illustrated in FIG. 32, illustrating a modified construction and utilizing the flexible decoupling aspect of the invention.
Figure 32:
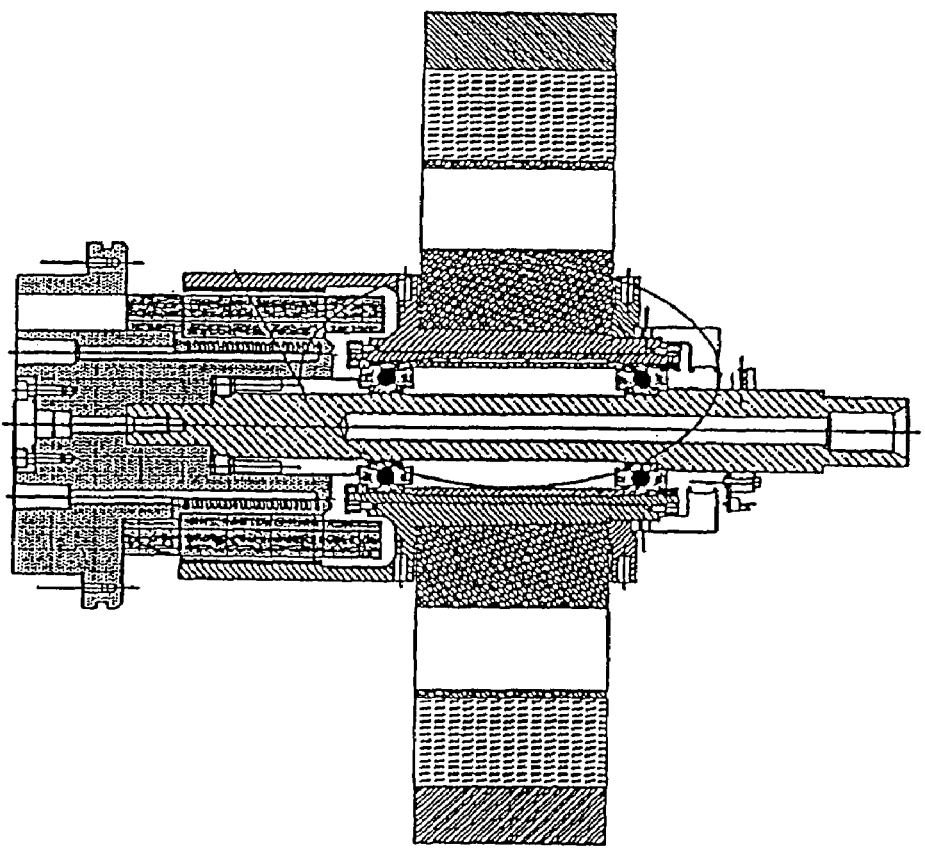
FIG. 32 is a sectional view of a flexible rim hub flywheel energy storage apparatus corresponding in large measure to the flywheel energy storage apparatus in FIG. 1.

FIG. 30 is a front view of an alternative embodiment of a flexible rim hub for use with flywheels in the flywheel energy storage systems of the invention. FIG. 31 is a sectional view taken through the flexible rim hub illustrated in FIG. 30.

The flexible rim hub illustrated in FIG. 30 embodies a balanced stress profile across the complete operating system. The hub illustrated in FIG. 30 when equipped with a flywheel employs a tight interference fit between the hub and the flywheel ring at low speeds. Hence, at low speeds, the rotor defined by the hub and rim illustrated in FIG. 30 together with a flywheel ring affixed thereto behaves as a rigid body. As rotor speed increases, centrifugal force causes the rim of the apparatus illustrated in FIG. 30 to expand radially beyond the expansion of the hub at the spokes. This separation phenomenon occurs at a predetermined speed and is a key to the operation of the apparatus illustrated in FIG. 30.

The separation permits avoidance of radial critical frequencies between the hub and the ring after lift off. The rim, after lift off, also provides high torsional stiffness thus avoiding torsional critical frequencies within the operating speed range. Furthermore, the radial pin concept, achieved by the tight interference between the flexible portion of the rim, which is at the mid-point between the spokes, and the surrounding flywheel ring, is used to retain concentricity of the hub rim and the flywheel ring thus maintaining rotor balance after lift off.

A principal advantage of this apparatus is that radial tracking of the rim, retention of ring-hub concentricity and avoidance of critical frequencies is accomplished by a gentle rolling action between the hub and the flywheel ring without any sliding or wear between the surfaces. Hence, long cyclic life results.

In the apparatus illustrated in FIG. 30 the rim is slightly thickened at the center area between the spokes. This improves the rim stress profile in that area over prior art designs and also provides a good surface for adding balance weights should those be required.

The hub illustrated in FIG. 30 manifests dynamic response which is virtually unchanged through and after lift off.

Referring to FIG. 22 of the drawings, the thick cylindrical rings, which function as the inner flywheel rings, are preferably manufactured from either metal matrix composites or special weaves, integrating both circumferencial and axial fiber lay ups or polar weaves with axial reinforcement. The thick cylindrical rings possess both the axial properties to function as carrier rings and the filament wound circumferential properties to function as inner flywheel rings. As illustrated, either single or multiple carbon rings may be stacked directly onto the thick cylindrical rings, preferably using thermal assembly.

While the preferred embodiment of the invention has been described above and alternative embodiments have also been described, the scope of protection to which the invention is believed entitled is defined by the claims and by equivalents thereto which perform substantially the same function in substantially the same way to achieve substantially the same result as the subject matter defined literally by the claims, so long as such substantial equivalents, as defined by a claim for such substantial equivalent, do not read on the prior art.

I claim the following:

1. Energy storage apparatus comprising:
   a. a shaft;
   b. a flywheel rotatable relative to said shaft;
   c. means for selectably rotating said flywheel responsively to electrical power input or producing electrical power upon rotation thereof by said flywheel;
   d. bearing means facilitating rotation of said flywheel and said flywheel rotation/power production means respecting said shaft;
   e. means for connecting said flywheel and said means for selectably rotating said flywheel or producing electrical power output to a portion of said bearing means which is rotatable relative to said shaft, comprising:
      i. an inner member rotatable with a portion of said bearing means relative to said shaft;
      ii. an outer member fixedly connected to said flywheel and flywheel rotation/power production means combination;
      iii. said inner and outer members contacting when stationary;
      iv. means for connecting said members for facilitating continued unitary rotation of said outer member with said inner member as rotation of said inner and outer member, said flywheel and said flywheel rotation/ power production means combination reaches a rate at which centrifugal force separates said members.

2. Apparatus of claim 1 wherein said rotation of said flywheel and said flywheel rotation/power production means is unitary.

3. Apparatus of claim 2 wherein said means for connecting said members for facilitation continued unitary rotation is elastomeric and is annular.

4. Apparatus of claim 3 wherein said elastomeric means comprises O-rings.

5. Apparatus of claim 1 further comprising:
a. a vacuum chamber surrounding said flywheel; and
b. means for evacuating said chamber to a substantial vacuum.

6. Apparatus of claim 1 wherein an axial length of a region of separation between said inner and outer members, upon rotation rate of said outer member, said flywheel and said flywheel rotation/power production means combination reaching a rate at which centrifugal force separates said sleeves, exceeds axial length of said flywheel.

7. Apparatus of claim 1 wherein said bearing means further comprises:
a. an outer bearing member connected to said outer member and having an inwardly facing race adapted to receive rotatable bearing elements for rotating motion of said rotatable elements respecting said outer bearing member;
b. an inner bearing member connected to said outer member and having an outwardly facing race adapted to receive said rotatable bearing elements for rotating motion of said rotatable bearing elements respecting said inner bearing member;
c. a plurality of said rotatable bearing elements retained between said inwardly facing and outwardly facing race surfaces; and
d. solid lubricant material biased against and contacting at least one of said rotatable bearing elements for depositing a film of said solid lubricant on said rotatable element by contact therewith as said rotatable elements rotate against said race surfaces.

8. Apparatus of claim 7 wherein said solid lubricant material is a ring.

9. Apparatus of claim 8 wherein said ring is radially inboard of said rotatable elements.

10. Apparatus of claim 9 wherein a first combination defined by said flywheel, said flywheel rotation/power production means and said outer sleeve has resonant frequency less than rotation frequency at which said outer sleeve separates from said inner sleeve due to centrifugal force and a second combination defined by said flywheel, said flywheel rotation/power production means, said outer sleeve and said inner sleeve has resonant frequency greater than rotational frequency at which said outer sleeve separates from said inner sleeve.

11. Energy storage apparatus comprising:
a. a frame;
b. a flywheel;
c. means for selectably rotating said flywheel responsively to electrical power input or producing electrical power upon rotation thereof by said flywheel;
d. bearing means facilitating rotation of said flywheel and said flywheel rotation/power production means respecting said frame;
e. means for connecting said flywheel and said means for selectably rotating said flywheel or producing electrical power output to said bearing means, comprising:
  i. a first member fixedly rotatable with a bearing means portion which is rotatable respecting said frame;
  ii. a second member concentric with said first member, fixedly connected to said flywheel and flywheel rotation/power production means combination;
  iii. said members contacting when stationary;
  iv. elastomeric means for connecting said members and thereby facilitating continued unitary rotation thereof as centrifugal force separates said members;
f. said flywheel-flywheel rotation/power production means-second member combination having resonant frequency below rotational frequency at which said members separate due to centrifugal force; and
g. said flywheel-flywheel rotation/power production means-second member-first member combination having resonant frequency above rotational frequency at which said members separate due to centrifugal force.

12. A method for storing energy comprising acceleratingly rotating a unitary subcombination of a flywheel and means for selectably driving said flywheel or producing electrical power upon rotation of said flywheel through resonant frequency of a unitary combination defined by an outer sleeve and said unitary subcombination to a rotational rate sufficient to separate a concentric inner sleeve from said outer sleeve in unison with said unitary combination but stopping short of resonant frequency of a second unitary combination defined by said inner and outer sleeves and said unitary subcombination.

13. The method of claim 12 wherein said inner and outer sleeves are in complemental contact prior to separation.

14. An energy storage rotor comprising a unitary metallic hub defining a center of rotation, said hub having a plurality of spaced apart spokes and a continuous rim to which said spokes are integrally connected at spaced apart locations, and a composite ring surrounding said rim, wherein said rim is in a tight interference fit with the composite ring at rest and behaves essentially as a solid body at lower rotational speeds, and wherein those portions of the rim disposed between said spokes are adapted to deflect radially outwardly under the influence of centrifugal force when in use at higher rotational speeds so as to follow the centrifugal force-induced radial expansion of the composite ring surrounding the rim such that at said higher rotational speeds portions of said composite ring can lift away from the rim of the hub at said locations where said spokes are connected to said rim and so that a tight fit between the rim and the ring is maintained at all operating speeds of the rotor and further wherein said rim portions between said spokes defined respective radially inwardly directed curved surface portions each having a center of curvature which is located radially outwardly of said center of rotation such that each of said rim portions becomes thinner toward a central portion between adjacent said spokes.

15. A rotor as claimed in claim 14 wherein the composite ring is bi-annular.

16. Coupling apparatus facilitating passage of an acceleratingly rotating body through a critical frequency of rotation, comprising:
a. a pair of mating first and second portions of said body, said portions contacting when said body is stationary; and
b. means for flexibly coupling said second portion to said first portion to facilitate continued substantially unitary rotation thereof as said second portion moves away from said first portion responsively to centrifugal force at rotational speed below said critical frequency.

17. Coupling apparatus of claim 16 wherein said portions contact with an interference fit when said body is stationary and at room temperature.

18. Coupling apparatus of claim 17 wherein said mating first and second portions are mutually facing when said second portion moves radially away from said first portion responsively to centrifugal force at rotational speed below said critical frequency.

19. Coupling apparatus of claim 18 wherein said second portion moves radially with respect to said first portion responsively to centrifugal force.

20. Coupling apparatus of claim 19 wherein said mating portions include mating surfaces that complementally contact at ambient temperature when said body is at rest.

21. A method for accelerating a rotating body through a critical frequency of rotation, said body having a second portion tending to separate from a first portion at body angular velocity below said critical frequency, comprising:
   a. permitting said second portion to move away from said first portion responsively to centrifugal force at rotational speed below said critical frequency thereby reducing effective mass of said rotating body and establishing a new critical frequency for said rotating body substantially shifted downwardly from said original critical frequency; and
   b. maintaining a flexible couple between said first and second portions to facilitate substantially unitary rotation thereof at common velocity but with separate angular momenta.

22. The method of claim 20 further comprising the step of permitting said second portion to self-bias itself radially inwardly to effectuate complemental contact between facing surfaces of said first and second portions when said body is at rest and at ambient temperature.

23. Apparatus for orienting a load, comprising:
   a. a shaft;
   b. a flywheel rotatable relative to said shaft;
   c. means for rotating said flywheel by driving said shaft;
   d. bearing means facilitating rotation of said flywheel respecting said shaft;
   e. means for connecting said flywheel and said shaft, comprising:
      i. an inner member rotatable with a portion of said bearing means relative to said shaft;
      ii. an outer member fixedly connected to said flywheel;
      iii. said inner and outer members contacting when stationary;
      iv. means for connecting said members for facilitating continued unitary rotation of said outer member with said inner member as rotation of said inner and outer members and said flywheel combination reaches a rate at which centrifugal force separates said members;
      v. a housing having said shaft and said flywheel rotatably mounted therewithin and defining an axis about which said flywheel is mounted for rotation in a single plane relative to said housing;
      vi. means connected to said housing and being rotatable about a second axis differing from the axis of rotation of said shaft, for rotatably securing the housing relative to said load.

24. The load orienting device of claim 23 wherein said means connecting said members for facilitating continued unitary rotation of said outer member with said inner member as rotation of said inner and outer members and said flywheel combination reaches a rate at which centrifugal force separates said members is elastomeric.

* * * * *